(12) United States Patent
Kuroda

(10) Patent No.: US 11,934,446 B2
(45) Date of Patent: Mar. 19, 2024

(54) INFORMATION PROVIDING SYSTEM

(71) Applicant: INFORMATION SYSTEM ENGINEERING INC., Tokyo (JP)

(72) Inventor: Satoshi Kuroda, Tokyo (JP)

(73) Assignee: INFORMATION SYSTEM ENGINEERING INC., Tokyo (JP)

( * ) Notice: Subject to any disclaimer, the term of this patent is extended or adjusted under 35 U.S.C. 154(b) by 0 days.

(21) Appl. No.: 17/029,980

(22) Filed: Sep. 23, 2020

(65) Prior Publication Data

US 2022/0019614 A1    Jan. 20, 2022

Related U.S. Application Data

(62) Division of application No. 16/962,085, filed as application No. PCT/JP2020/013358 on Mar. 25, 2020, now Pat. No. 11,651,023.

(30) Foreign Application Priority Data

Mar. 29, 2019  (JP) ................................. 2019-069367
Jul. 9, 2019  (JP) ................................. 2019-127965

(51) Int. Cl.
  *G06F 16/51*  (2019.01)
  *G06F 16/583*  (2019.01)
  *G06N 20/00*  (2019.01)

(52) U.S. Cl.
  CPC ............ *G06F 16/51* (2019.01); *G06F 16/583* (2019.01); *G06N 20/00* (2019.01)

(58) Field of Classification Search
  CPC ...... G06F 16/51; G06F 16/583; G06F 16/532; G06F 16/432; G06F 3/011; G06N 20/00;
  (Continued)

(56) References Cited

U.S. PATENT DOCUMENTS 5,778,381 A * 7/1998 Sandifer ................ G06Q 10/06
                                                   707/999.107
7,039,625 B2 * 5/2006 Kim ....................... G06F 40/247
                                                        707/706
(Continued)

FOREIGN PATENT DOCUMENTS

CA    3021720 A1 *  4/2019   .......... G06F 11/0709
CN    1532621 A      9/2004
(Continued)

OTHER PUBLICATIONS

S. Lu, T. Mei, J. Wang, J. Zhang, Z. Wang and S. Li, "Exploratory Product Image Search With Circle-to-Search Interaction," in IEEE Transactions on Circuits and Systems for Video Technology, vol. 25, No. 7, pp. 1190-1202, Jul. 2015, doi: 10.1109/TCSVT.2014. 2372272. (Year: 2015).*

(Continued)

*Primary Examiner* — Dennis Truong
(74) *Attorney, Agent, or Firm* — Holtz, Holtz & Volek PC

(57) ABSTRACT

An information providing system includes a content association database storing external information, in which content is divided in a chunk structure, and chunk reference information, in which reference information having a different attribute than the content is divided in a chunk structure, in association with each other. An external information similarity calculation database is built on machine learning using the external information. A processor acquires specific external information, and compares the external information with the acquired specific external information. The processor looks up the external information similarity calculation database, and calculates a similarity between the external information and the specific external information, when the external information does not match with the acquired specific external information. The processor selects first external information from the (Continued)

stored external information, based on the calculated similarity, and extracts chunk reference information associated with the first external information as first chunk reference information.

7 Claims, 28 Drawing Sheets

(58) Field of Classification Search
 CPC .. G06N 3/08; G06N 5/022; G02B 2027/0138;
  G02B 2027/0141; G02B 27/017; G06Q
  10/00
 See application file for complete search history.

(56) References Cited

U.S. PATENT DOCUMENTS

| | | | |
|---|---|---|---|
| 8,196,212 B2 | 6/2012 | Tsusaka et al. | |
| 8,442,268 B2 | 5/2013 | Isogai et al. | |
| 8,732,025 B2* | 5/2014 | Gokturk | G06Q 30/0623 705/26.1 |
| 8,799,401 B1 | 8/2014 | Bryar et al. | |
| 9,164,506 B1 | 10/2015 | Zang | |
| 10,140,421 B1 | 11/2018 | Bernard et al. | |
| 10,192,087 B2 | 1/2019 | Davis et al. | |
| 10,438,050 B2 | 10/2019 | Watanabe et al. | |
| 10,643,073 B2 | 5/2020 | Sugaya | |
| 10,878,283 B2 | 12/2020 | Kurita et al. | |
| 10,885,618 B2 | 1/2021 | Hanzawa et al. | |
| 11,222,081 B2 | 1/2022 | Whigham et al. | |
| 2003/0126129 A1* | 7/2003 | Watson | G06F 40/151 |
| 2004/0183918 A1 | 9/2004 | Squilla et al. | |
| 2004/0230564 A1* | 11/2004 | Simon | G06F 16/951 |
| 2004/0260694 A1* | 12/2004 | Chaudhuri | G06F 16/215 707/999.005 |
| 2005/0171661 A1* | 8/2005 | Abdel-Malek | G06Q 10/06 701/19 |
| 2006/0123000 A1* | 6/2006 | Baxter | G06F 16/30 707/999.005 |
| 2006/0136362 A1* | 6/2006 | Jones | G06F 16/88 715/776 |
| 2006/0161313 A1* | 7/2006 | Rogers | G06F 3/0481 701/1 |
| 2006/0287993 A1* | 12/2006 | Yao | G06F 16/24578 |
| 2007/0188626 A1 | 8/2007 | Squilla et al. | |
| 2008/0028362 A1 | 1/2008 | Ugai et al. | |
| 2008/0120282 A1* | 5/2008 | Liberty | G06F 16/958 |
| 2009/0265313 A1* | 10/2009 | Wang | G06F 40/154 |
| 2011/0093449 A1* | 4/2011 | Belenzon | G06N 7/005 707/E17.108 |
| 2011/0222832 A1 | 9/2011 | Aizawa | |
| 2011/0238668 A1* | 9/2011 | Matsumoto | G06F 16/93 707/E17.083 |
| 2011/0243453 A1 | 10/2011 | Kashima et al. | |
| 2012/0075343 A1* | 3/2012 | Chen | G06T 19/006 345/633 |
| 2012/0086792 A1 | 4/2012 | Akbarzadeh et al. | |
| 2012/0209470 A1* | 8/2012 | Gilbert | G06Q 10/087 707/769 |
| 2013/0010068 A1 | 1/2013 | Tiernan et al. | |
| 2013/0138696 A1* | 5/2013 | Turdakov | G06F 16/367 707/794 |
| 2013/0215264 A1 | 8/2013 | Soatto et al. | |
| 2013/0266228 A1 | 10/2013 | Markson et al. | |
| 2014/0009476 A1 | 1/2014 | Venkitaraman et al. | |
| 2014/0061304 A1 | 3/2014 | Drees et al. | |
| 2014/0111542 A1 | 4/2014 | Wan | |
| 2014/0320677 A1 | 10/2014 | Jarvenpaa et al. | |
| 2014/0355879 A1 | 12/2014 | Agosta et al. | |
| 2015/0253977 A1 | 9/2015 | Kang | |
| 2016/0019212 A1* | 1/2016 | Soldani | G06V 10/17 345/633 |
| 2016/0026900 A1 | 1/2016 | Ando | |
| 2016/0049010 A1 | 2/2016 | Hinski | |
| 2016/0162748 A1* | 6/2016 | Bastide | G06T 19/006 345/633 |
| 2016/0287987 A1 | 10/2016 | Onda et al. | |
| 2016/0342681 A1* | 11/2016 | Kesin | G06F 16/93 |
| 2016/0378939 A1 | 12/2016 | Baumberger et al. | |
| 2017/0124447 A1* | 5/2017 | Chang | G06F 40/279 |
| 2017/0193575 A1* | 7/2017 | King | G06Q 30/0601 |
| 2017/0344958 A1 | 11/2017 | Lumera et al. | |
| 2018/0101791 A1* | 4/2018 | Viswanathan | G06N 20/20 |
| 2018/0105186 A1 | 4/2018 | Motomura et al. | |
| 2018/0150598 A1 | 5/2018 | Kohls et al. | |
| 2018/0330818 A1 | 11/2018 | Hsieh et al. | |
| 2018/0342050 A1 | 11/2018 | Fitzgerald et al. | |
| 2018/0342060 A1 | 11/2018 | Yao et al. | |
| 2019/0019166 A1 | 1/2019 | Vahid | |
| 2019/0045158 A1 | 2/2019 | Osanai et al. | |
| 2019/0108411 A1 | 4/2019 | Liu et al. | |
| 2019/0110856 A1 | 4/2019 | Barral et al. | |
| 2019/0122269 A1* | 4/2019 | Pugazhendhi | G06Q 30/0631 |
| 2019/0163975 A1* | 5/2019 | Desai | G06V 10/751 |
| 2019/0171886 A1 | 6/2019 | Ashour et al. | |
| 2019/0236489 A1* | 8/2019 | Koudal | G06N 20/00 |
| 2019/0262084 A1 | 8/2019 | Roh et al. | |
| 2019/0278992 A1 | 9/2019 | Hossain et al. | |
| 2019/0286942 A1 | 9/2019 | Abhiram et al. | |
| 2019/0325299 A1 | 10/2019 | Oliveira Pinheiro | |
| 2019/0333633 A1 | 10/2019 | Sugaya | |
| 2019/0362243 A1 | 11/2019 | Matsumura | |
| 2020/0019780 A1 | 1/2020 | Sugaya | |
| 2020/0026257 A1 | 1/2020 | Dalal et al. | |
| 2020/0034782 A1 | 1/2020 | Hsieh et al. | |
| 2020/0058001 A1 | 2/2020 | Naritake et al. | |
| 2020/0105067 A1* | 4/2020 | Sutter | G06F 40/58 |
| 2020/0193206 A1 | 6/2020 | Turkelson et al. | |
| 2020/0210850 A1 | 7/2020 | Nuthi et al. | |
| 2021/0089824 A1 | 3/2021 | Ge et al. | |
| 2021/0365685 A1 | 11/2021 | Shah et al. | |
| 2022/0245558 A1 | 8/2022 | Kuroda | |
| 2023/0033090 A1 | 2/2023 | Kuroda | |

FOREIGN PATENT DOCUMENTS

| | | | |
|---|---|---|---|
| CN | 101315652 A | 12/2008 | |
| CN | 101855633 A | 10/2010 | |
| CN | 105027162 A | 11/2015 | |
| CN | 106920071 A | 7/2017 | |
| CN | 107403194 A | 11/2017 | |
| CN | 107531244 A | 1/2018 | |
| CN | 109767418 A | 5/2019 | |
| CN | 109782902 A | 5/2019 | |
| CN | 109961421 A | 7/2019 | |
| CN | 110135449 A | 8/2019 | |
| CN | 113168906 A * | 7/2021 | G02B 27/017 |
| EP | 2775408 A1 | 9/2014 | |
| JP | 2005196540 A | 7/2005 | |
| JP | 2006309486 A | 11/2006 | |
| JP | 2010003190 A | 1/2010 | |
| JP | 2011090348 A | 5/2011 | |
| JP | 2011170690 A | 9/2011 | |
| JP | 2014085730 A | 5/2014 | |
| JP | 2014224877 A | 12/2014 | |
| JP | 2014238680 A | 12/2014 | |
| JP | 2015106862 A | 6/2015 | |
| JP | 2017224133 A | 12/2017 | |
| JP | 6267841 B1 | 1/2018 | |
| JP | 2018049421 A | 3/2018 | |
| JP | 6321879 B1 | 5/2018 | |
| JP | 2018092227 A | 6/2018 | |
| JP | 2018097437 A | 6/2018 | |
| JP | 2018097580 A | 6/2018 | |
| JP | 2018101353 A | 6/2018 | |
| JP | 2018194949 A | 12/2018 | |
| JP | 2018206085 A | 12/2018 | |
| JP | 2018206341 A | 12/2018 | |
| JP | 2019021150 A | 2/2019 | |
| JP | 2019032593 A | 2/2019 | |
| JP | 2019109844 A | 7/2019 | |
| JP | 6651190 B1 | 2/2020 | |
| KR | 102419018 B1 | 7/2022 | |

(56) References Cited

FOREIGN PATENT DOCUMENTS

| WO | WO-2011105671 A1 * | 9/2011 | ......... G06K 9/00671 |
|---|---|---|---|
| WO | 2017169907 A1 | 10/2017 | |
| WO | 2017216929 A1 | 12/2017 | |
| WO | 2018100878 A1 | 6/2018 | |

OTHER PUBLICATIONS

International Search Report (ISR) and Written Opinion dated Apr. 28, 2020 issued in International Application No. PCT/JP2020/013358.

Related U.S. Appl. No. 16/962,055; First Named Inventor: Satoshi Kuroda; Title: "Learning Method and Information Providing System", filed Jul. 14, 2020.

Related U.S. Appl. No. 16/962,113; First Named Inventor: Satoshi Kuroda; Title: "Learning Method and Information Providing System", filed Jul. 14, 2020.

Related U.S. Appl. No. 16/604,079; First Named Inventor: Satoshi Kuroda; Title: "Information Service System and Information Service Method", filed Oct. 9, 2019.

Related U.S. Appl. No. 16/765,130; First Named Inventor: Satoshi Kuroda; Title: "Information Providing System and Information Providing Method", filed May 18, 2020.

Related U.S. Appl. No. 16/765,139; First Named Inventor: Satoshi Kuroda; Title: "Information Providing System and Information Providing Method", filed May 18, 2020.

Chinese Office Action (and English language translation thereof) dated Jun. 21, 2021, issued in Chinese Application No. 201980003667.8 (which is a Chinese counterpart of related U.S. Appl. No. 16/604,079).

Office Action (Non-Final Rejection) dated Mar. 2, 2022 issued in related U.S. Appl. No. 16/962,085.

International Search Report (ISR) and Written Opinion dated Apr. 7, 2020 issued in International Application No. PCT/JP2020/005544.

International Search Report (ISR) and Written Opinion dated Apr. 7, 2020 issued in International Application No. PCT/JP2020/005545.

International Search Report (ISR) and Written Opinion dated Aug. 13, 2019 issued in International Application No. PCT/JP2019/028626.

International Search Report (ISR) and Written Opinion dated Jun. 16, 2020 issued in International Application No. PCT/JP2020/013352.

International Search Report (ISR) and Written Opinion dated Jun. 16, 2020 issued in International Application No. PCT/JP2020/013357.

International Search Report (ISR) and Written Opinion dated May 18, 2021 issued in International Application No. PCT/JP2021/010015.

International Search Report (ISR) and Written Opinion dated Oct. 27, 2020 issued in International Application No. PCT/JP2020/029033.

U.S. Appl. No. 17/417,987, First Named Inventor: Satoshi Kuroda; Title: "Information Processing Device and Information Processing Method", filed Jun. 24, 2021.

Related U.S. Appl. No. 16/972,273; First Named Inventor: Satoshi Kuroda; Title: "Information Providing System", filed Dec. 4, 2020.

Notice of Allowance dated Jan. 14, 2022, issued in related U.S. Appl. No. 16/604,079.

Office Action (Non-Final Rejection) dated Apr. 13, 2022, issued in related U.S. Appl. No. 16/765,139.

Office Action (Non-Final Rejection) dated Mar. 31, 2022, issued in related U.S. Appl. No. 16/765,130.

Office Action (Final Rejection) dated Aug. 10, 2022, issued in related U.S. Appl. No. 16/962,085.

Notice of Allowance dated Dec. 29, 2022, issued in related U.S. Appl. No. 16/962,085.

Office Action (Non-Final Rejection) dated Aug. 11, 2023, issued in related U.S. Appl. No. 16/962,113.

Waddell, "A High-Tech Future; Windsor manufacturing well-positioned to benefit from innovation", The Windsor Star, Retrieved from https://dialog.proquest.com/professional/docview/1958571404?accountid=1 31444.

Office Action (Non-Final Rejection) dated Jul. 24, 2023, issued in related U.S. Appl. No. 16/962,055.

Office Action (Non-Final Rejection) dated Apr. 17, 2023, issued in related U.S. Appl. No. 17/417,987.

Office Action (Non-Final Rejection) dated Mar. 29, 2023, issued in related U.S. Appl. No. 16/972,273.

Lueddemann, et al., "Dynamic generation of technical documentation for medical devices", IEEE International Conference on Robotics and Biomimetics (ROBIO 2014), Bali, Indonesia, doi: 10.1109/ROBIO.2014.7090637, 2014, pp. 2043-2048.

Chinese Office Action dated Nov. 29, 2023, issued in Chinese U.S. Appl. No. 16/962,055.6 (which is a counterpart of related U.S. Appl. No. 16/962,055).

Chinese Office Action dated Dec. 28, 2023, issued in Chinese Application No. 202080005900.9 (which is a counterpart of related U.S. Appl. No. 16/972,273).

* cited by examiner

FIG. 11

SCENE MODEL TABLE

| SCENE ID | TRAINING MODEL |
|----------|----------------|
| OFE      | ...            |
| OFD      | ...            |
| ⋮        | ⋮              |

FIG. 12

SCENE CONTENT MODEL TABLE (OFE)

| CONTENT ID | TRAINING MODEL |
|---|---|
| 1B827-02 | ... |
| [NULL] | ... |
| ⋮ | ⋮ |

FIG. 13

SCENE TABLE

| SCENE ID | SCENE NAME |
|---|---|
| OFD | RESTART ABC-999 DEVICE |
| OFE | REMOVE MEMORY FROM ABC-999 DEVICE |
| ⋮ | ⋮ |

FIG. 16

SUMMARY TABLE

| CONTENT ID | SUMMARY OF REFERENCE INFORMATION |
|---|---|
| CONTENT ID-A | SUMMARY 1 |
| CONTENT ID-B | SUMMARY 2 |
| CONTENT ID-C | SUMMARY 3 |
| ⋮ | ⋮ |

FIG. 17

REFERENCE SUMMARY LIST

| SUMMARY OF REFERENCE INFORMATION | META-ID |
|---|---|
| SUMMARY 1 | IDaa |
| SUMMARY 2 | IDaa, IDac |
| SUMMARY 3 | IDab |
| ... | ... |

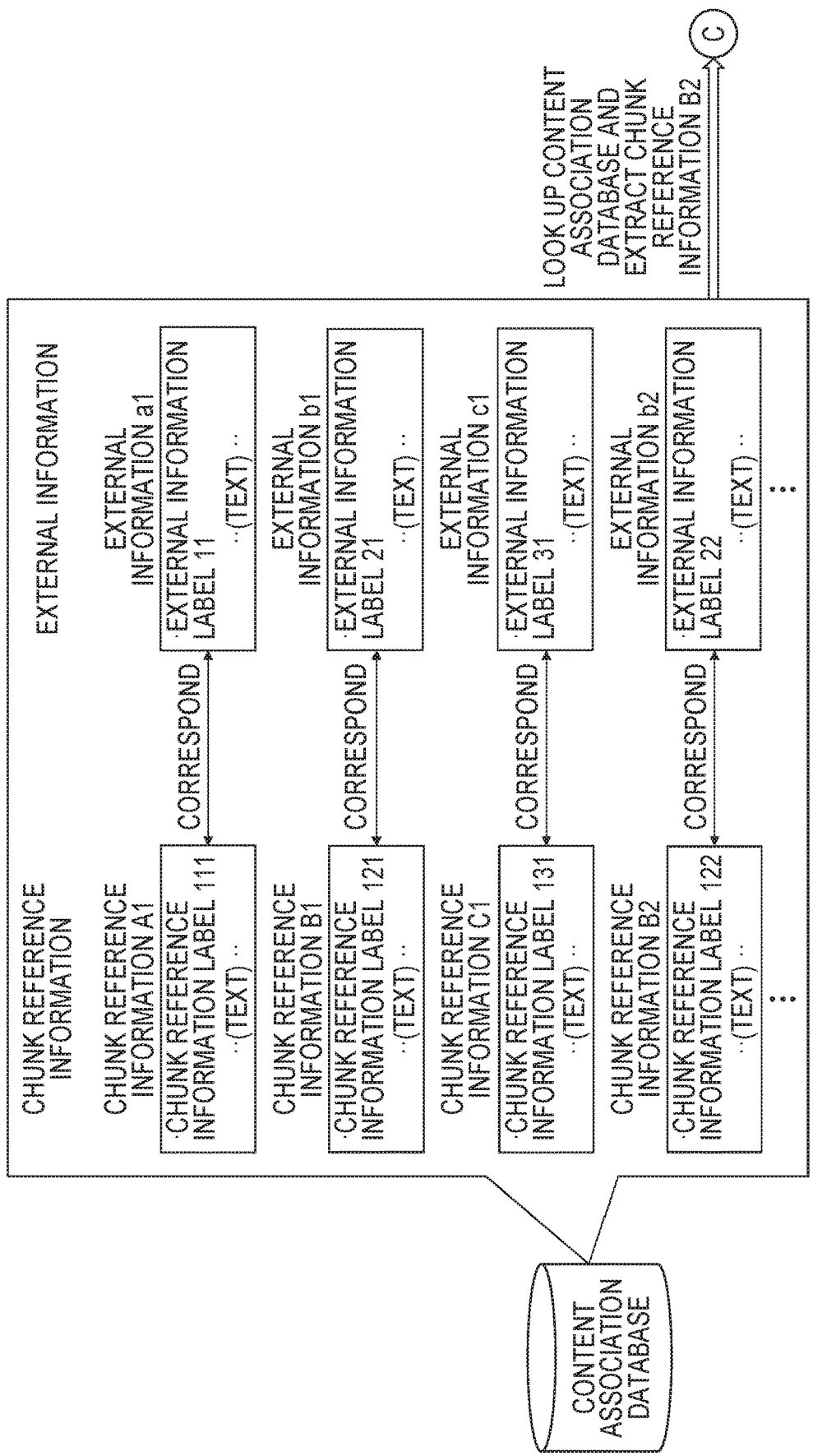

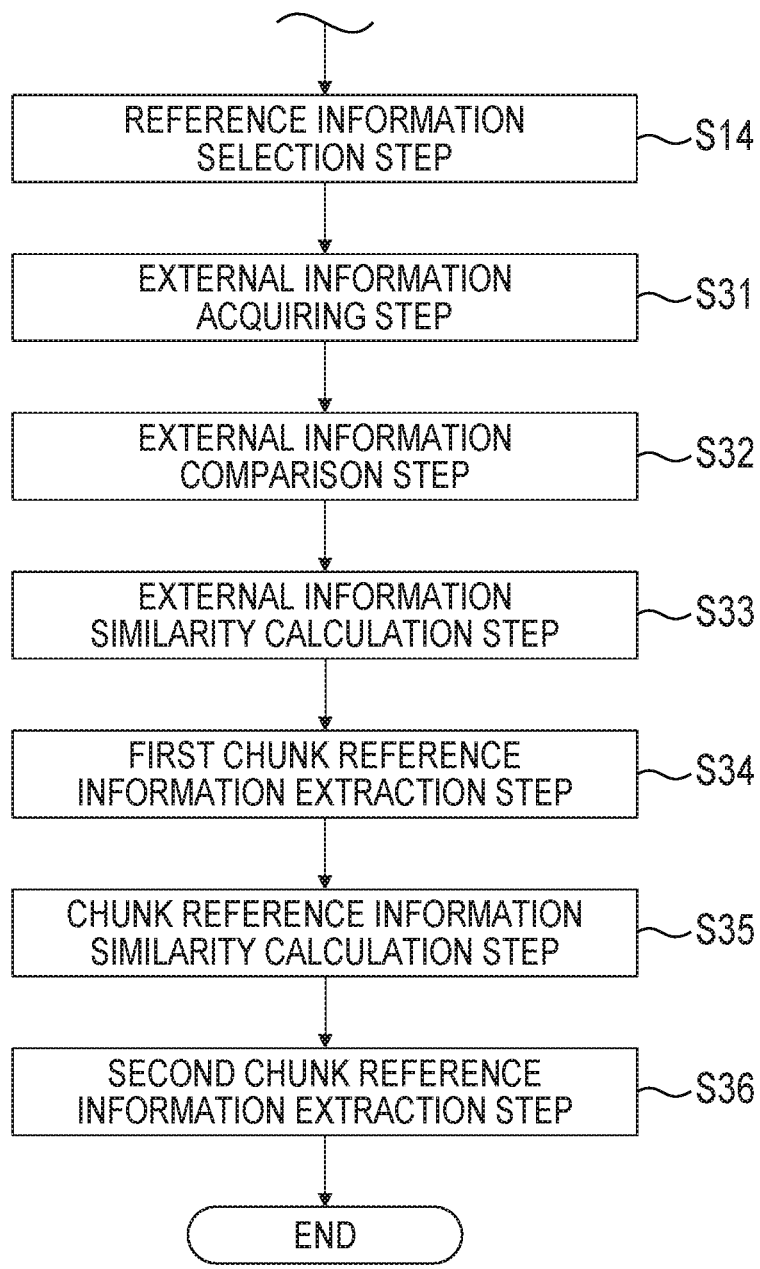

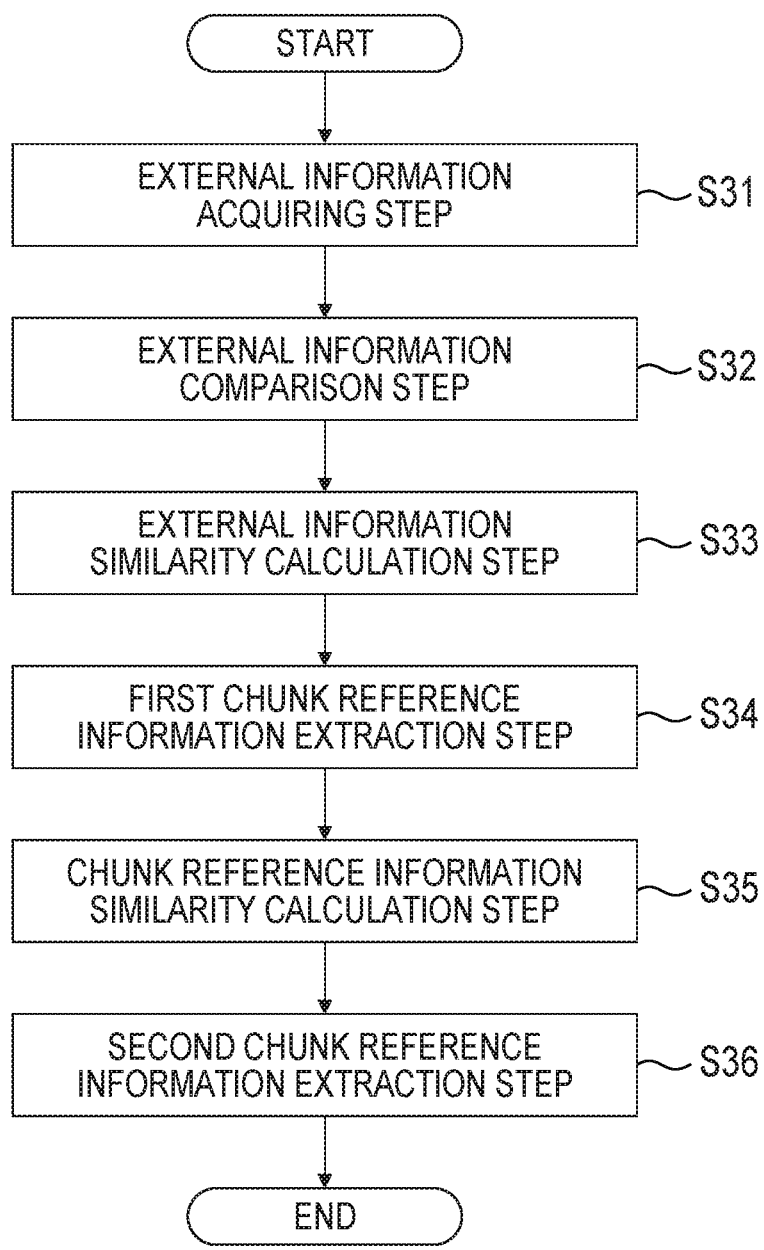

INFORMATION PROVIDING SYSTEM

CROSS REFERENCE TO RELATED APPLICATIONS

This application is a Divisional Application of U.S. application Ser. No. 16/962,085, filed Jul. 14, 2020, which is a U.S. National Phase application of PCT Application No. PCT/JP2020/013358, filed Mar. 25, 2020. PCT Application No. PCT/JP2020/013358 is based upon and claims benefit of priority from Japanese Patent Application No. 2019-069367, filed Mar. 29, 2019 and Japanese Patent Application No. 2019-127965, filed Jul. 9, 2019. The entire contents of all the above-identified applications are incorporated herein by reference.

TECHNICAL FIELD

The present invention relates to an information providing system.

BACKGROUND ART

In recent years, techniques for providing predetermined information to users from acquired images have been drawing attention. For example, in patent literature 1, an image of a crop is acquired from a wearable terminal, and a predicted harvest time is displayed, as augmented reality, on a display panel of the wearable terminal.

The wearable terminal display system of patent literature 1 is a wearable terminal display system for displaying the harvest time of a crop on a display panel of a wearable terminal, and provided with an image acquiring means for acquiring an image of a crop that has entered the field of view of the wearable terminal, an identifying means for analyzing the image and identifying the type of the crop, a selection means for selecting determination criteria based on the type, a determination means for analyzing the image based on the determination criteria and determining the color and size, a prediction means for predicting the harvest time of the crop based on the determination result, and a harvest time display means for displaying, on the display panel of the wearable terminal, as augmented reality, the predicted harvest time of the crop that is visible through the display panel.

CITATION LIST

Patent Literature

Patent Literature 1: Japanese Patent No. 6267841

SUMMARY OF INVENTION

Problem to be Solved by the Invention

However, the wearable terminal display system disclosed in patent literature 1 specifies the type of a crop by analyzing images. Therefore, when a new relationship between an image and the crop is acquired, the wearable terminal display system has to learn this relationship anew, through machine learning. Consequently, when a new relationship is acquired, the time it takes for its updating poses the problem.

The present invention has been made in view of the above, and it is therefore an object of the present invention to provide an information providing system, whereby tasks can be performed in a short time.

Means for Solving the Problem

A data structure for machine learning, according to the present invention, is used to build a first database, which a user to perform a task related to a device uses when selecting reference information that is appropriate when the user works on the task, and stored in a storage unit provided in a computer, and this data structure for machine learning has a plurality of items of training data that each include evaluation target information, including image data, and a meta-ID, the image data includes an image that shows the device and an identification label for identifying the device, the meta-ID is linked with a content ID that corresponds to the reference information, and the plurality of items of training data are used to build the first data base on machine learning, implemented by a control unit provided in the computer.

A learning method, according to the present invention, is used to build a first database, which a user to perform a task related to a device uses when selecting reference information that is appropriate when the user works on the task, and implements machine learning by using a data structure for machine learning according to the present invention, stored in a storage unit provided in a computer.

An information providing system, according to the present invention, selects reference information that is appropriate when a user to perform a task related to a device works on the task, and has a first database that is built on machine learning, using a data structure for machine learning according to the present invention.

An information providing system, according to the present invention, selects reference information that is appropriate when a user to perform a task related to a device works on the task, and has acquiring means for acquiring acquired data including first image data, in which a specific device and a specific identification label for identifying the specific device are photographed, a first database that is built on machine learning, using a data structure for machine learning, which includes a plurality of items of training data that each include evaluation target information including image data, and a meta-ID linked with the evaluation target information, meta-ID selection means for looking up the first database and selecting a first meta-ID, among a plurality of meta-IDs, based on the acquired data, a second database that stores a plurality of content IDs linked with the meta-IDs, and a plurality of items of reference information corresponding to the content IDs, content ID selection means for looking up the second database and selecting a first content ID, among the plurality of content IDs, based on the first meta-ID, and reference information selection means for looking up the second database and selecting first reference information, among the plurality of items of reference information, based on the first content ID, and the image data includes an image showing the device and an identification label for identifying the device.

Advantageous Effects of Invention

According to the present invention, tasks can be performed in a short time.

BRIEF DESCRIPTION OF DRAWINGS

FIG. 11 is a schematic diagram to show an example of a scene model table according to the present embodiment;

FIG. 12 is a schematic diagram to show an example of a scene content model table according to the present embodiment;

FIG. 13 is a schematic diagram to show an example of a scene table according to the present embodiment;

FIG. 16 is a schematic diagram to show an example of a summary table according to the present embodiment;

FIG. 17 is a schematic diagram to show an example of a reference summary list according to the present embodiment;

FIG. 24A is a schematic diagram to show an example of a content association database;

FIG. 25 is a flowchart to show a second example of a variation of the operation of an information providing system according to the present embodiment; and FIG. 26 is a flowchart to show a third example of a variation of the operation of an information providing system according to the present embodiment.

DESCRIPTION OF EMBODIMENTS

Hereinafter, examples of a data structure for machine learning, a learning method and an information providing system according to embodiments of the present invention will be described with reference to the accompanying drawings.

(Configuration of Information Providing System 100)

Figure 1:
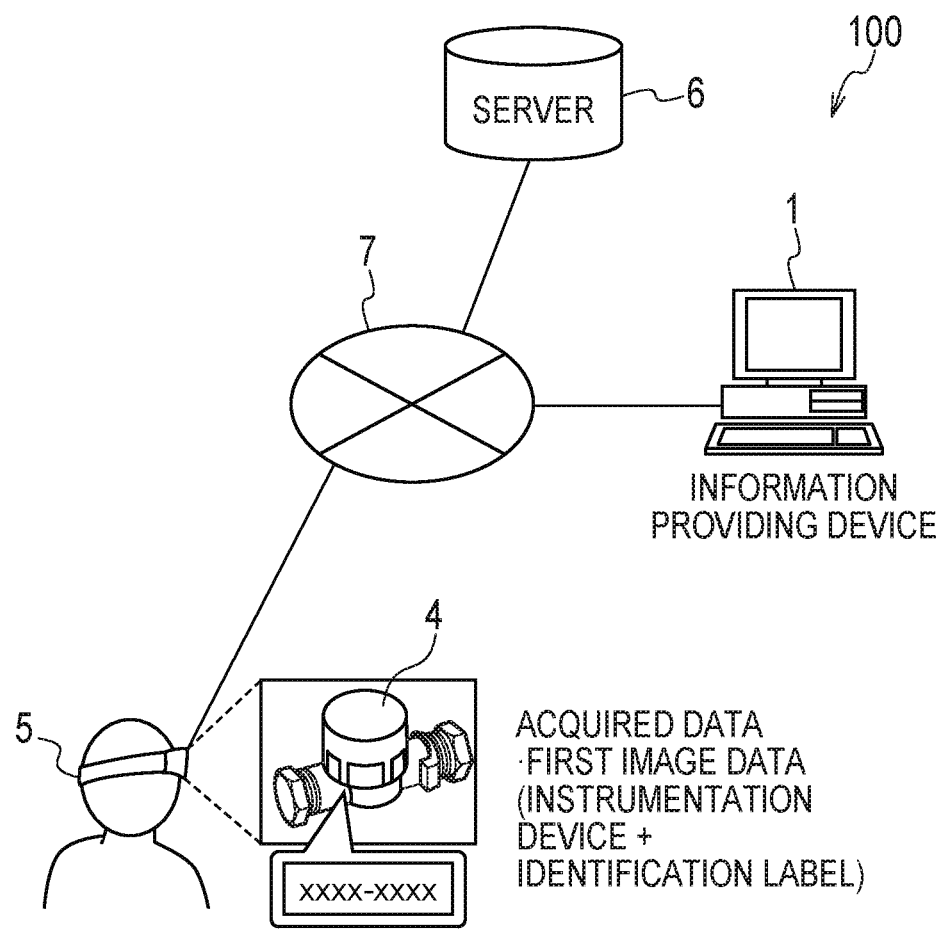
FIG. 1 is a schematic diagram to show an example of the configuration of an information providing system according to the present embodiment.

Examples of configurations of an information providing system 100 according to the present embodiment will be described below with reference to FIG. 1 to FIG. 7. FIG. 1 is a block diagram to show an overall configuration of the information providing system 100 according to the present embodiment.

The information providing system 100 is used by users who use apparatus. Now, cases will be described below in which the apparatus refers to instrumentation devices 4. The information providing system 100 is used by users such as engineers who use instrumentation devices 4, and the like. The information providing system 100 is used primarily for instrumentation devices 4, which are used by engineers and the like. The information providing system 100 selects, from acquired data that carries image data of an instrumentation device 4, first reference information that is appropriate when a user to perform a task related to the instrumentation device 4 works on the task. The information providing system 100 can provide, for example, the manual of the instrumentation device 4 to the user, and, in addition, provide incident information related to the instrumentation device 4, for example, to the user. By this means, the user can check the manual of the instrumentation device 4, learn about incidents related to the instrumentation device 4, and so forth.

As shown in FIG. 1, the information providing system 100 includes an information providing device 1. The information providing device 1, for example, may be connected with at least one of a user terminal 5 and a server 6 via a public communication network 7.

Figure 2:
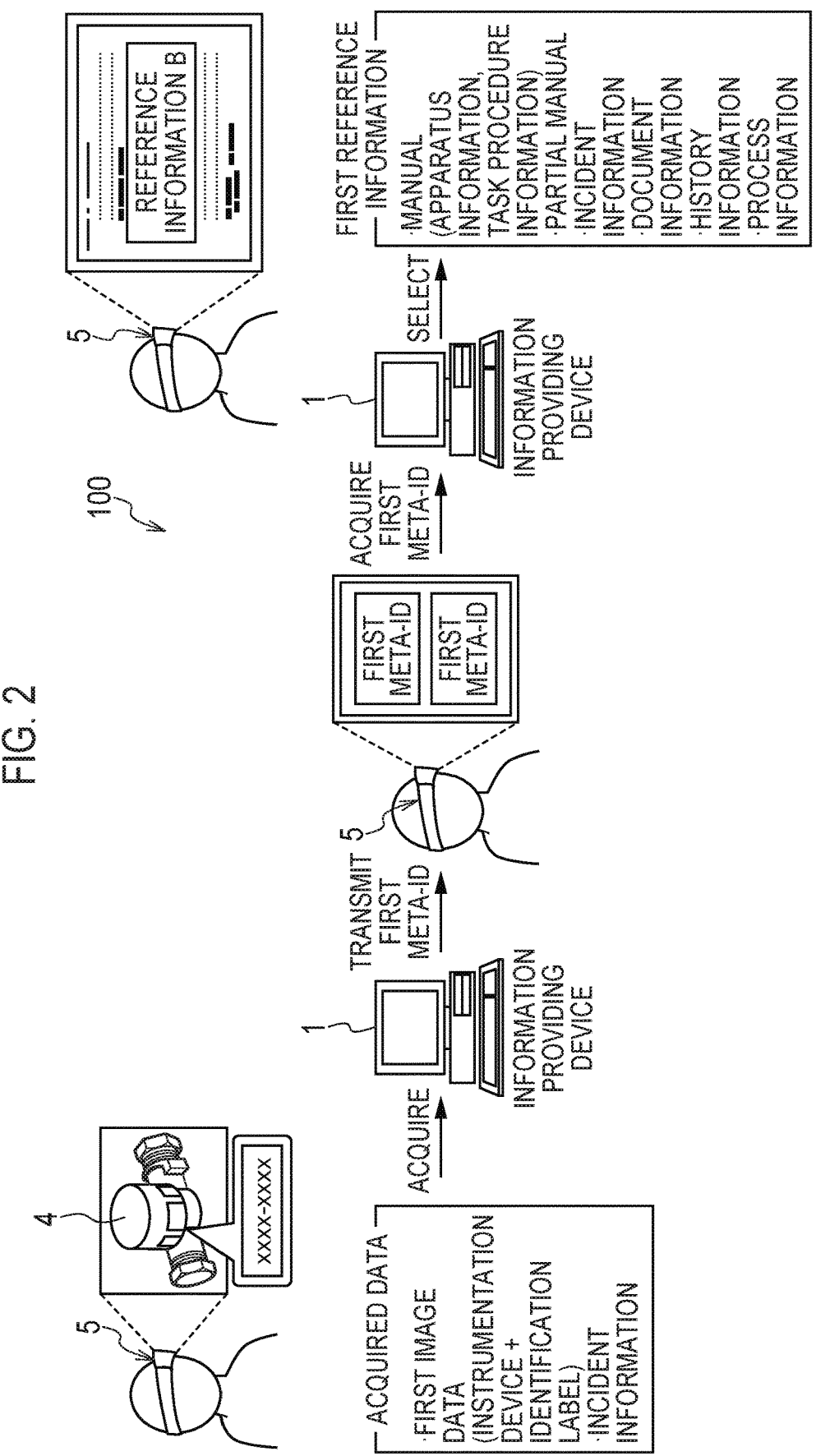
FIG. 2 is a schematic diagram to show an example of the use of an information providing system according to the present embodiment.

FIG. 2 is a schematic diagram to show an example of the use of the information providing system 100 according to the present embodiment. The information providing device 1 acquires data that carries first image data. The information providing device 1 selects the first meta-ID based on the acquired data, and transmits the first meta-ID to the user terminal 5. The information providing device 1 acquires the first meta-ID from the user terminal 5. The information providing device 1 selects first reference information based on the first meta-ID acquired, and transmits the first reference information to the user terminal 5. By this means, the user can find out the first reference information related to the instrumentation device 4 such as the manual of the instrumentation device 4.

Figure 3:
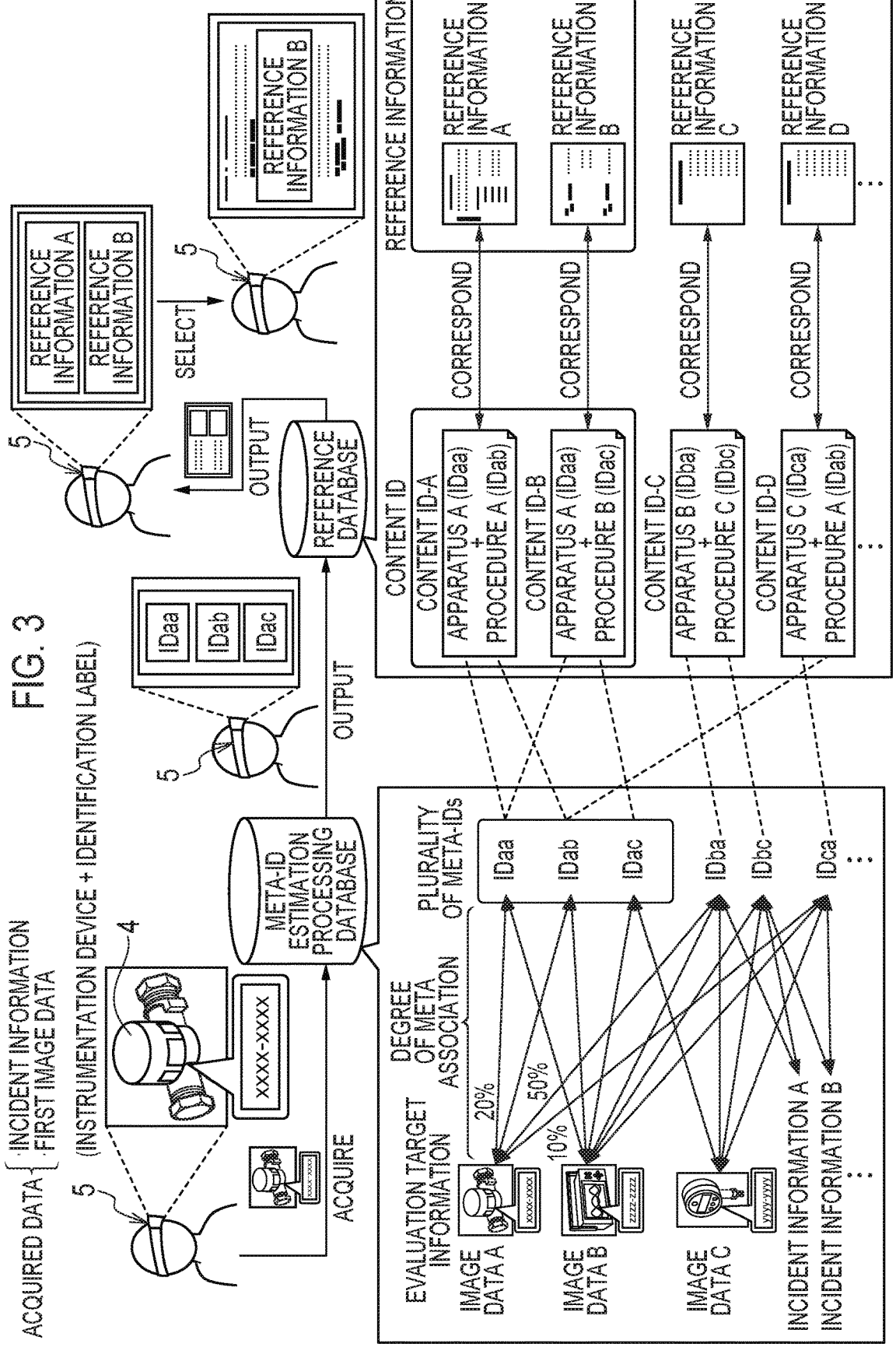
FIG. 3 is a schematic diagram to show examples of a meta-ID estimation processing database and a reference database according to the present embodiment.

FIG. 3 is a schematic diagram to show examples of a meta-ID estimation processing database and a reference database according to the present embodiment. The information providing device 1 looks up the meta-ID estimation processing database (first database), and selects the first meta-ID, among a plurality of meta-IDs, based on the acquired data. The information providing device 1 looks up the reference database (second database), and selects the first content ID, among a plurality of content IDs, based on the first meta-ID selected. The information providing device 1 looks up the reference database, and selects the first reference information, among a plurality of items of reference information, based on the first content ID selected.

The meta-ID estimation processing database is built on machine learning, using a data structure for machine learning, to which the present invention is applied. The data structure for machine learning, to which the present invention is applied, is used to build the meta-ID estimation processing database, which a user to perform a task related to an instrumentation device 4 uses to select reference information that is appropriate when the user works on the task, and stored in a storage unit 104 provided in the information providing device 1 (computer).

Figure 4:
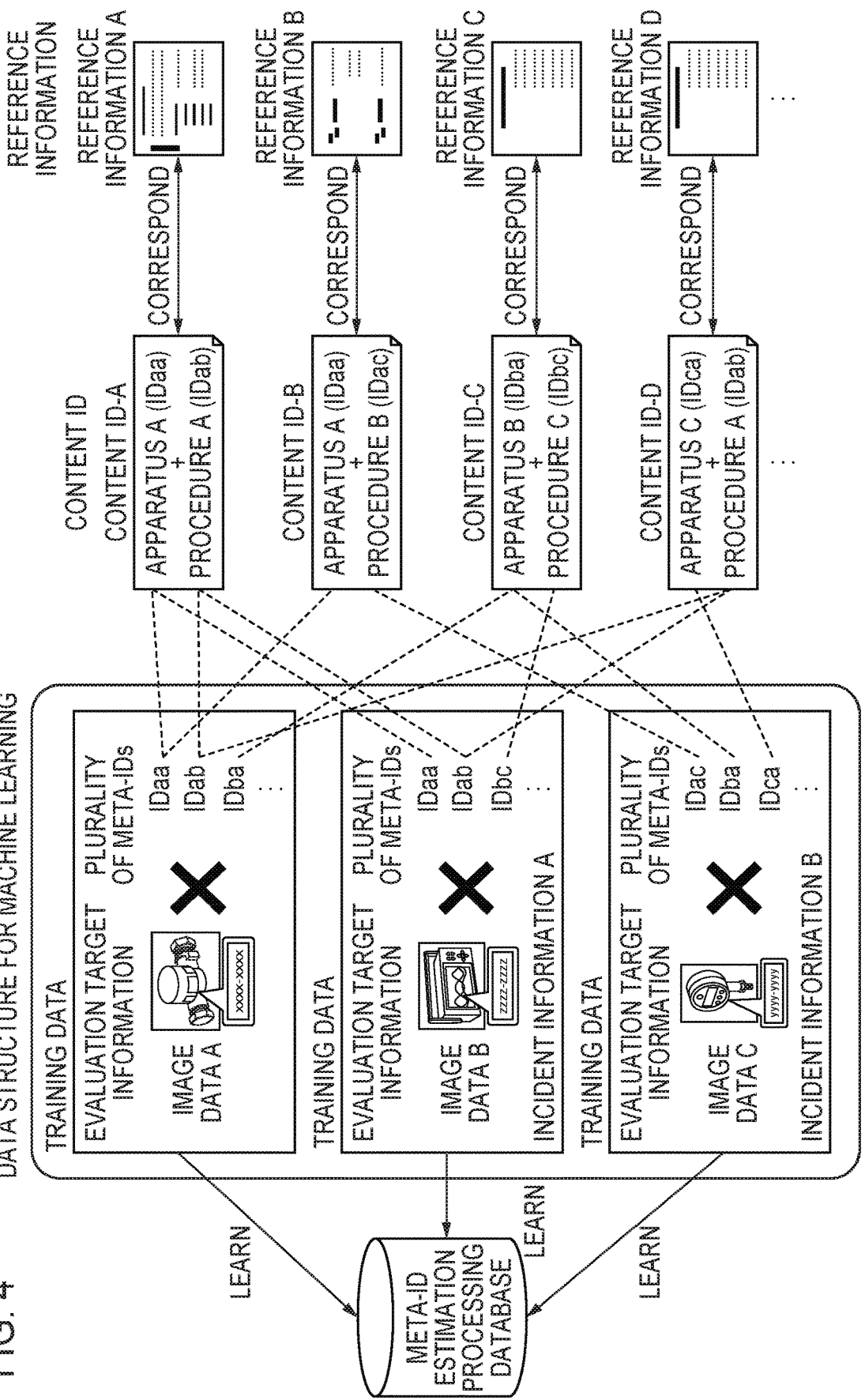
FIG. 4 is a schematic diagram to show an example of the data structure for machine learning according to the present embodiment.

FIG. 4 is a schematic diagram to show an example of the data structure for machine learning according to the present embodiment. The data structure for machine learning, to which the present invention is applied, carries a plurality of items of training data. The items of training data are used to build the meta-ID estimation processing database, on machine learning implemented by a control unit 18, which is provided in the information providing device 1. The meta-ID estimation processing database may be a pre-trained model built on machine learning, using a data structure for machine learning.

The training data includes evaluation target information and meta-IDs. The meta-ID estimation processing database is stored in a storage unit 104.

The evaluation target information includes image data. The image data includes, for example, an image showing an instrumentation device 4 and an identification label for identifying that instrumentation device 4. The image may be a still image or a moving image. For the identification label, one that consists of a character string of a tug number, a serial number, a product name, a model name, a reference number assigned so as to allow the user and/or others to identify the instrumentation device 4, and so forth may be used, or a one-dimensional code such as a bar code, a two-dimensional code such as a QR code (registered trademark) and/or the like may be used. The evaluation target information may further include incident information.

The incident information includes information about nearmiss accidents of the instrumentation device 4, accident cases of the instrumentation device 4, and so forth. The incident information includes information about emergencies and disasters such as accidents, fires and so forth. The incident information includes alarm information, which relates to warnings, alarms and/or the like produced by the instrumentation device 4. The incident information includes event information about events such as irregular processes, control and so forth, that take place in the instrumentation device 4. The incident information includes abnormality information about the abnormalities or failures of the instrumentation device 4. The incident information may be, for example, a file such as an audio file or the like, and may be a file such as an audio file of a foreign language translation corresponding to Japanese. For example, if one country's language is registered in audio format, a translated audio file of a foreign language corresponding to that registered audio file may be stored together.

The meta-IDs consist of character strings and are linked with content IDs. The meta-IDs are smaller in volume than the reference information. The meta-IDs include, for example, an apparatus meta-ID that classifies the instrumentation device 4 shown in the image data, and a task procedure meta-ID that relates to the task procedures for the instrumentation device 4 shown in the image data.

The acquired data carries first image data. The first image data is an image taken by photographing a specific instrumentation device and a specific identification label to identify that specific instrumentation device. The first image data is, for example, image data taken by the camera of a user terminal 5 or the like. The acquired data may further include incident information. The meta-IDs may also include an incident meta-ID that relates to the incident information shown in the acquired data.

As shown in FIG. 3, the degrees of meta association between evaluation target information and meta-IDs are stored in the meta-ID estimation processing database. The degree of meta association shows how strongly evaluation target information and meta-IDs are linked, and is expressed, for example, in percentage, or in three or more levels, such as ten levels, five levels, and so on. For example, referring to FIG. 3, "image data A" included in evaluation target information shows its degree of meta association with the meta-ID "IDaa", which is "20%", and shows its degree of meta association with the meta-ID "IDab", which is "50%". This means that "IDab" is more strongly linked with "image data A" than "IDaa" is.

The meta-ID estimation processing database may have, for example, an algorithm that can calculate the degree of meta association. For example, a function (classifier) that is optimized based on evaluation target information, meta-IDs, and the degree of meta association may be used for the meta-ID estimation processing database.

The meta-ID estimation processing database is built by using, for example, machine learning. For the method of machine learning, for example, deep learning is used. The meta-ID estimation processing database is, for example, built with a neural network, and, in that case, the degrees of meta association may be represented by hidden layers and weight variables.

The reference database stores a plurality of content IDs and reference information. The reference database is stored in the storage unit 104.

The content IDs consist of character strings, each linked with one or more meta-IDs. The content IDs are smaller in volume than the reference information. The content IDs include, for example, an apparatus ID that classifies the instrumentation device 4 shown in the reference information, and a task procedure ID that relates to the task procedures for the instrumentation device 4 shown in the reference information. The content IDs may further include, for example, an incident ID that relates to the incident information of the instrumentation devices 4 shown in the reference information. The apparatus IDs are linked with the apparatus meta-IDs in the meta-IDs, and the task procedure IDs are linked with the task procedure meta-IDs in the meta-IDs.

The reference information corresponds to content IDs. One item of reference information is assigned one content ID. The reference information includes, for example, information about the instrumentation device 4. The reference information includes, for example, the manual, partial manuals, incident information, document information, history information, process information and so forth, of the instrumentation device 4. The reference information may have a chunk structure, in which meaningful information constitutes a chunk of a data block. The reference information may be a movie file. The reference information may be an audio file, and may be an audio file of a foreign language translation corresponding to Japanese. For example, if one country's language is registered in audio format, a translated audio file of a foreign language corresponding to that registered audio file may be stored together.

The manual includes apparatus information and task procedure information. The apparatus information is information that classifies the instrumentation device 4, and includes the specification, the operation and maintenance manual and so forth. The task procedure information includes information about the task procedures of the instrumentation device 4. The apparatus information may be linked with an apparatus ID, and the task procedure information may be linked with a task procedure ID. The reference information may include apparatus information, task procedure information and so on.

The partial manuals refer to predetermined portions of the manual that are divided. The partial manuals may divide the manual, for example, per page, per chapter, or per chunk structure, in which meaningful information constitutes a chunk of a data block. The manual and the partial manuals may be movies or audio data.

As mentioned earlier, the incident information includes information about nearmiss accidents of the instrumentation device 4, accident cases of the instrumentation device 4 issued by administrative agencies such as the Ministry of Health, Labor and Welfare, and so forth. Also, as mentioned earlier, the incident information may include alarm information about the alarms that may be produced by the instrumentation device 4. In this case, the incident information may be linked, at least, either with apparatus IDs or task procedure IDs.

The document information includes, for example, the specification, a research paper, a report, a drawing and so on the instrumentation device 4.

The history information is information about, for example, the history of inspection, failures, and repairs of the instrumentation device 4.

The process information is data acquired by the instrumentation device 4 and shows instruction data, operation output data, configuration data, alarm status, measurement data, and so forth, pertaining to the instrumentation device 4.

The information providing system 100 includes a meta-ID estimation processing database (first database), which is built on machine learning, using a data structure for machine learning, in which a plurality of items of training data, including evaluation target information carrying image data of instrumentation devices 4 and meta-IDs, are stored, and the meta-IDs are linked with content IDs. Therefore, even when reference information is updated anew, it is only necessary to change the links between meta-IDs and the content ID corresponding to the reference information, and it is not necessary to update the relationship between evaluation target information and meta-IDs anew. By this means, it is not necessary to rebuild the meta-ID estimation processing database when reference information is updated. Therefore, it becomes possible to perform the task of updating in a short time.

Also, with the information providing system 100, the training data includes meta-IDs. Consequently, when building the meta-ID estimation processing database, machine learning can be implemented using meta-IDs that are smaller in volume than reference information. This makes it possible to build the meta-ID estimation processing database in a shorter time than when machine learning is implemented using reference information.

Also, when searching for reference information, the information providing system 100 uses a meta-ID, which is smaller in volume than image data, as a search query, and a content ID, which is smaller in volume than reference information is returned as a result to match or partially match with the search query, so that the amount of data to communicate and the processing time of the search process can be reduced.

Furthermore, when creating a system for searching for reference information by using machine learning based on a data structure for machine learning, the information providing system 100 can use image data as acquired data (input information) for use as search keywords. Consequently, the user does not need to verbalize the information or the specific instrumentation device that the user wants to search for, by way of character input or voice, so that the search is possible without the knowledge of the information, the name of the instrumentation device, and so on.

The learning method according to the embodiment is implemented on machine learning, using a data structure for machine learning according to the embodiment, which is used to build a meta-ID estimation processing database that a user to perform a task related to an instrumentation device uses when selecting reference information that is appropriate when the user works on the task, and which is stored in the storage unit provided in a computer. Therefore, even when reference information is updated anew, it is only necessary to change the links between meta-IDs and the content ID corresponding to the reference information, and it is not necessary to update the relationship between evaluation target information and meta-IDs anew. By this means, it is not necessary to rebuild the meta-ID estimation processing database when reference information is updated. Therefore, it becomes possible to perform the task of updating in a short time.

<Information Providing Device 1>

Figure 5:
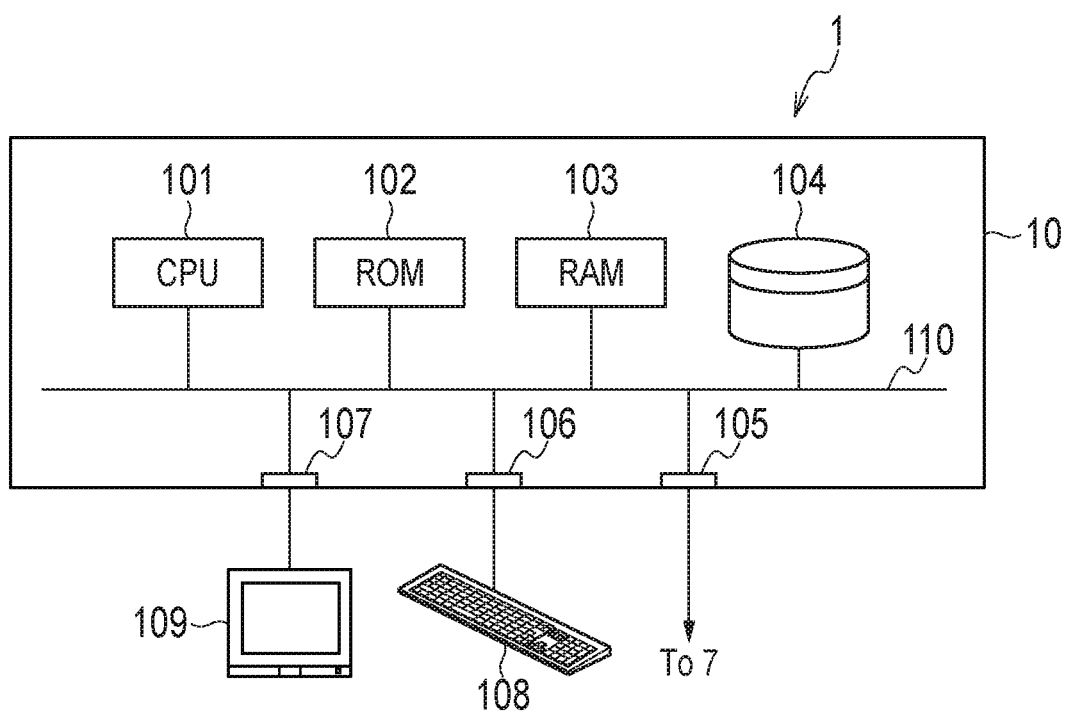
FIG. 5 is a schematic diagram to show an example of the configuration of an information providing device according to the present embodiment.
Figure 6:
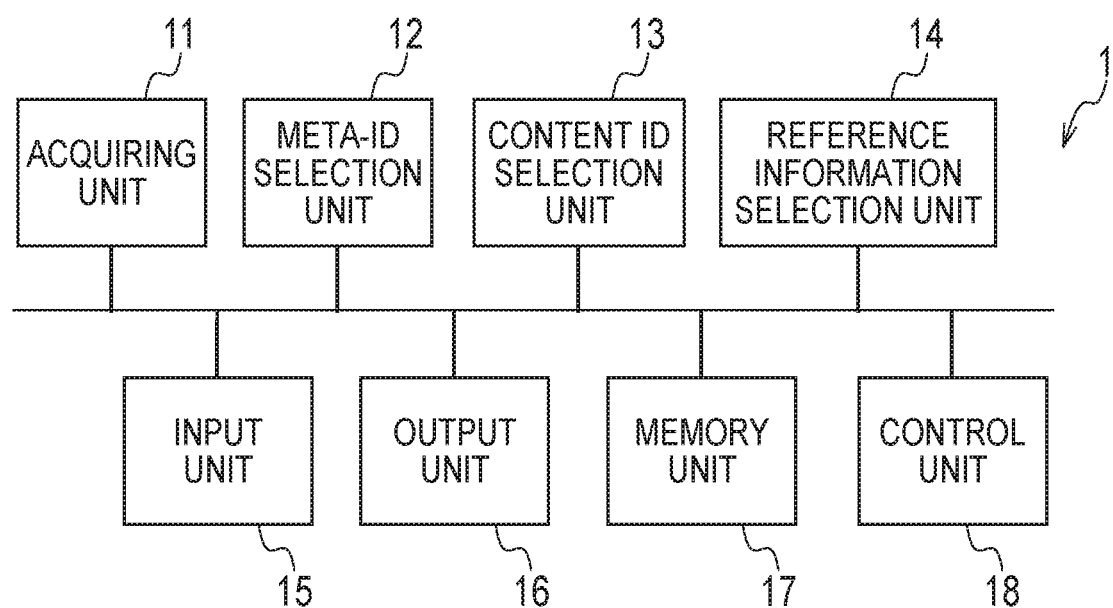
FIG. 6 is a schematic diagram to show an example of functions of an information providing device according to the present embodiment.

FIG. 5 is a schematic diagram to show an example of the configuration of an information providing device 1. An electronic device such as a smartphone or a tablet terminal other than a personal computer (PC) may be used as the information providing device 1. The information providing device 1 includes a housing 10, a CPU 101, a ROM 102, a RAM 103, a storage unit 104 and I/Fs 105 to 107. The configurations 101 to 107 are connected by internal buses 110.

The CPU (Central Processing Unit) 101 controls the entire information providing device 1. The ROM (Read Only Memory) 102 stores operation codes for the CPU 101. The RAM (Random Access Memory) 103 is the work area for use when the CPU 101 operates. A variety of types of information, such as data structures for machine learning, acquired data, a meta-ID estimation processing database, a reference database, a content database (described later), a scene model database (described later) and so forth are stored in the storage unit 104. For the storage unit 104, for example, an SSD (Solid State Drive) or the like is used, in addition to an HDD (Hard Disk Drive).

The I/F 105 is an interface for transmitting and receiving a variety of types of information to and from a user terminal 5 and/or the like, via a public communication network 7. The I/F 106 is an interface for transmitting and receiving a variety of types of information to and from an input part 108. For example, a keyboard is used as the input part 108, and the user to use the information providing system 100 inputs or selects a variety of types of information, control commands for the information providing device 1 and so forth, via the input part 108. The I/F 107 is an interface for transmitting and receiving a variety of types of information to and from the output part 109. The output part 109 outputs a variety of types of information stored in the storage unit 104, the state of processes in the information providing device 1, and so forth. A display may be used for the output part 109, and this may be, for example, a touch panel type. In this case, the output part 109 may be configured to include the input part 108.

FIG. 5 is a schematic diagram to show an example of functions of the information providing device 1. The information providing device 1 includes an acquiring unit 11, a meta-ID selection unit 12, a content ID selection unit 13, a reference information selection unit 14, an input unit 15, an output unit 16, a memory unit 17, and a control unit 18. Note that the functions shown in FIG. 5 are implemented when the CPU 101 runs programs stored in the storage unit 104 and elsewhere, by using the RAM 103 for the work area. Furthermore, each function may be controlled by, for example, artificial intelligence. Here, "artificial intelligence" may be based on any artificial intelligence technology that is known.

<Acquiring Unit 11>

The acquiring unit 11 acquires a variety of types of information such as acquired data. The acquiring unit 11 acquires training data for building a meta-ID estimation processing database.

<Meta-ID Selection Unit 12>

The meta-ID selection unit 12 looks up the meta-ID estimation processing database, and selects first meta-IDs, among a plurality of meta-IDs, based on the acquired data. For example, when the meta-ID estimation processing database shown in FIG. 3 is used, the meta-ID selection unit 12 selects evaluation target information (for example, "image data A") that is the same as or similar to the "first image data" included in the acquired image data. Also, when the meta-ID estimation processing database shown in FIG. 3 is used, the meta-ID selection unit 12 selects evaluation target information (for example, "image data B" and "incident information A") that is the same as or similar to the "first image data" and "incident information" included in the acquired data.

As for the evaluation target information, information that partially or completely matches with the acquired data is selected, and, for example, similar information (including the same concept and/or the like) is used. The acquired data and the evaluation target information each include information of equal characteristics, so that the accuracy of selection of evaluation target information can be improved.

The meta-ID selection unit 12 selects one or more first meta-IDs, from a plurality of meta-IDs linked with the selected evaluation target information. For example, when the meta-ID estimation processing database shown in FIG. 3 is used, the meta-ID selection unit 12 selects, for example, the meta-IDs "IDaa", "IDab", and "IDac", as first meta-IDs, among a plurality of meta-IDs "IDaa", "IDab", "IDac", "IDba", and "IDca" linked with selected "image data A".

Note that the meta-ID selection unit 12 may set a threshold for the degree of meta association, in advance, and select meta-IDs to show higher degrees of meta association than that threshold, as first meta-IDs. For example, if the degree of meta association of 50% or higher is the threshold, the meta-ID selection unit 12 may select "IDab", which shows a degree of meta association of 50% or higher, as a first meta-ID.

<Content ID Selection Unit 13>

The content ID selection unit 13 looks up the reference database, and selects first content IDs, among a plurality of content IDs, based on the first meta-IDs. For example, when the reference database shown in FIG. 3 is used, the content ID selection unit 13 selects content IDs (for example, "content ID-A", "content ID-B", etc.) linked with the selected first meta-IDs "IDaa", "IDab", and "IDac", as first content IDs. In the reference database shown in FIG. 3, "content ID-A" is linked with the meta-IDs "IDaa" and "IDab", and "content ID-B" is linked with the meta-IDs "IDaa" and "IDac". That is, the content ID selection unit 13 selects content IDs linked with any of the first meta-IDs "IDaa", "IDab", and "IDac", or combinations of these, as first content IDs. The content ID selection unit 13 uses a first meta-ID as search query, and selects results that match or partially match with the search query as first content IDs.

Also, if there is an apparatus meta-ID, among the selected first meta-IDs, that is linked with the apparatus ID under a content ID, and there is a task procedure meta-ID that is linked with the task procedure ID under a content ID, the content ID selection unit 13 selects the content ID with the apparatus ID linked with the apparatus meta-ID or the content ID with the task procedure ID linked with the task procedure meta-ID, as a first content ID.

<Reference Information Selection Unit 14>

The reference information selection unit 14 looks up the reference database, and selects first reference information, among a plurality of items of reference information, based on the first content ID. For example, when the reference database shown in FIG. 3 is used, the reference information selection unit 14 selects the reference information (for example, "reference information A") that corresponds to the selected first content ID "content ID-A", as first reference information.

<Input Unit 15>

The input unit 15 inputs a variety of types of information to the information providing device 1. The input unit 15 inputs a variety of types of information such as training data and acquired data via the I/F 105, and, additionally, inputs a variety of types of information from the input part 108 via, for example, the I/F 106.

<Output Unit 16>

The output unit 16 outputs the first meta-ID, reference information and the like to the output part 109 and elsewhere. The output unit 16 transmits the first meta-IDs, the reference information and so forth, to the user terminal 5 and elsewhere, via the public communication network 7, for example.

<Memory Unit 17>

The memory unit 17 stores a variety of types of information such as data structures for machine learning and acquired data, in the storage unit 104, and retrieves the various information stored in the storage unit 104 as necessary. Further, the memory unit 17 stores a variety of databases such as a meta-ID estimation processing database, a reference database, a content database (described later), and a scene model database (described later), in the storage unit 104, and retrieves the various databases stored in the storage unit 104 as necessary.

<Control Unit 18>

The control unit 18 implements machine learning for building a first database by using a data structure for machine learning, to which the present invention is applied. The control unit 18 implements machine learning using linear regression, logistic regression, support vector machines, decision trees, regression trees, random forest, gradient boosting trees, neural networks, Bayes, time series, clustering, ensemble learning, and so forth.

<Instrumentation Device 4>

Instrumentation devices 4 as used herein are industrial instruments (detection unit, display unit, adjusting unit, operating unit, etc.) such as measurement devices, control devices and so forth that are equipped so that plants and processes can fulfill their missions. For example, an instrumentation device 4 may be an instrumentation device that is for use for cascade control for controlling the output of one controller to have the target value (setting value) of another controller. The instrumentation device 4 may be either the primary controller, which is the controller of the end of the control target where controlled output is produced, or the secondary controller of the end where the target value is given. The instrumentation device 4 may be an instrumentation device for use for feedback control, in which control is exerted so that correctional operations are made depending on results. The instrumentation device 4 may be an instrumentation device for use for feedforward control, in which control is exerted so that the impact of disturbance is cancelled. The instrumentation device 4 is, for example, a device that is installed in a factory, a production line and/or the like. The instrumentation device 4 may be a device to measure the flow rate of liquid or gas, such as a variable area flowmeter, a turbine flowmeter, a volumetric flowmeter, an electromagnetic flowmeter, and/or the like. The instrumentation device 4 may be an orifice, a venturi tube, a nozzle, and/or the like. The instrumentation device 4 may be a valve, an angle valve, a three-way valve, a butterfly valve, a damper, a looper, a ball valve, and/or the like. The instrumentation device 4 may be a transmitter. The instrumentation device 4 may be a valve of a diaphragm type, an electric type, an electromagnetic type, or a piston type. The instrumentation device 4 may be a device to measure pressure, such as a barometer, a vacuum gauge, and/or the like. The instrumentation device 4 may be a device to measure acceleration, such as an accelerometer, an inertial measurement unit, and/or the like. The instrumentation device 4 may be a device to measure electricity, such as a circuit tester, an ammeter, a voltmeter, a resistance meter, a galvanometer, a frequency meter, an electrostatic capacity meter, an oscilloscope, a network analyzer (high frequency circuit), a spectrum analyzer, an SWR meter, a power meter, a dip meter, an antenna analyzer, and/or the like. The instrumentation device 4 may be a device to measure temperature, such as a thermometer, a clinical thermometer, and/or the like. The instrumentation device 4 may be a device to measure time, such as a clock, a stopwatch, and/or the like. The instrumentation device 4 may be a device to measure light, such as a spectrophotometer, a fluorometer, an astronomical telescope, and/or the like. The instrumentation device 4 may be a device to measure radiation, such as an ionization chamber, a Geiger-Muller counter, a scintillation detector, a semiconductor detector flowmeter, and/or the like. The instrumentation device 4 may be a monitoring device to monitor a variety of measurement devices in a central control room for controlling a variety of measurement devices in plants and processes.

<User Terminal 5>

A user terminal 5 refers to a terminal that a user to control an instrumentation device 4 has. For example, the user terminal 5 may be HoloLens (registered trademark), which is one type of HMD (Head-Mounted Display). The user can check the work area, specific instrumentation devices and so forth through a display unit that shows the first meta-IDs and the first reference information of the user terminal 5 in a transparent manner, such as a head-mounted display, HoloLens, and so forth. This allows the user to confirm the situation in front of him/her, and also check the manual and so forth selected based on acquired data. Besides, electronic devices such as a mobile phone (mobile terminal), a smartphone, a tablet terminal, a wearable terminal, a personal computer, an IoT (Internet of Things) device, and, furthermore, any electronic device can be used to implement the user terminal 5. The user terminal 5 may be, for example, connected to the information providing system 1 via the public communication network 7, and, besides, for example, the user terminal 5 may be directly connected to the information providing system 1. The user may use the user terminal 5 to acquire the first reference information from the information providing system 1, and, besides, control the information providing system 1, for example.

<Server 6>

The server 6 stores a variety of types of information, which has been described above. The server 6 stores, for example, a variety of types of information transmitted via the public communication network 7. The server 6 may store the same information as in the storage unit 104, for example, and transmit and receive a variety of types of information to and from the information providing device 1 via the public communication network 7. That is, the information providing device 1 may use the server 6 instead of the storage unit 104.

<Public Communication Network 7>

The public communication network 7 is, for example, an Internet network, to which the information providing device 1 and the like are connected via a communication circuit. The public communication network 7 may be constituted by a so-called optical fiber communication network. Furthermore, the public communication network 7 is not limited to a cable communication network, and may be implemented by a known communication network such as a wireless communication network.

(Example of Operation of Information Providing System 100)

Figure 7:
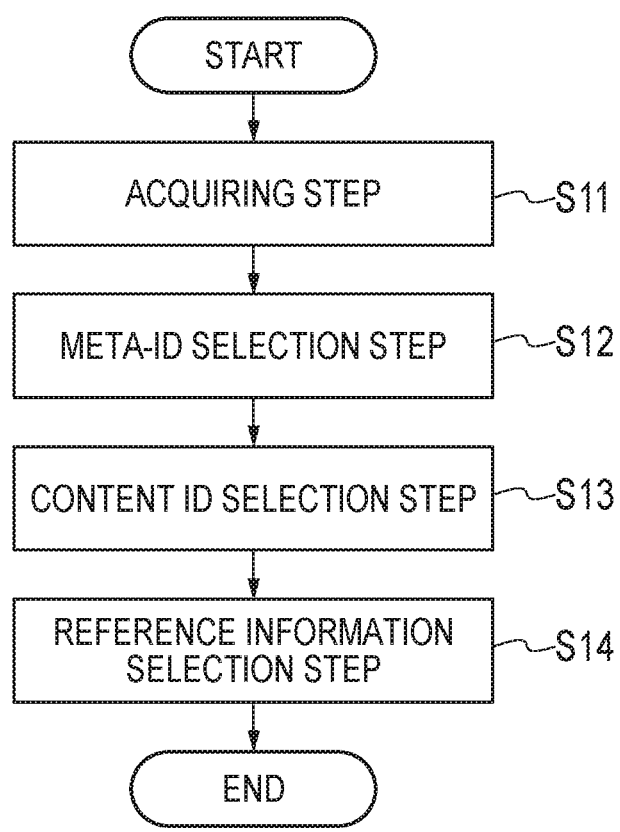
FIG. 7 is a flowchart to show an example of the operation of an information providing system according to the present embodiment.

Next, an example of the operation of an information providing system 100 according to the present embodiment will be described. FIG. 7 is a flowchart to show an example of the operation of an information providing system 100 according to the present embodiment.

<Acquiring Step S11>

First, the acquiring unit 11 acquires data (acquiring step S11). The acquiring unit 11 acquires the data via the input unit 15. The acquiring unit 11 acquires data that carries first image data, which is photographed by the user terminal 5, and incident information, which is stored in the server 6 or the like. The acquiring unit 11 stores the acquired data in the storage unit 104 via, for example, the memory unit 17.

The acquired data may be generated by the user terminal 5. The user terminal 5 generates acquired data that carries first image data, in which a specific instrumentation device and a specific identification label to identify that specific instrumentation device are photographed. The user terminal 5 may further generate incident information, or acquire incident information from the server 6 or elsewhere. The user terminal 5 may generate acquired data that carries the first image data and the incident information. The user terminal 5 transmits the generated acquired data to the information providing device 1. The input unit 15 receives the acquired data, and the acquiring unit 11 acquires the data.

<Meta-ID Selection Step S12>

Next, the meta-ID selection unit 12 looks up the meta-ID estimation processing database, and selects the first meta-ID, among a plurality of meta-IDs, based on the acquired data (meta-ID selection step S12). The meta-ID selection unit 12 acquires the data acquired in the acquiring unit 11, and acquires the meta-ID estimation processing database stored in the storage unit 104. The meta-ID selection unit 12 may select one first meta-ID for one item of acquired data, or select, for example, a plurality of first meta-IDs for one item of acquired data. The meta-ID selection unit 12 stores the selected first meta-ID in the storage unit 104 via, for example, the memory unit 17.

The meta-ID selection unit 12 transmits the first meta-ID to the user terminal 5, and has the first meta-ID displayed on the display unit of the user terminal 5. By this means, the user can check the selected first meta-ID and the like. Note that the meta-ID selection unit 12 may have the first meta-ID displayed on the output part 109 of the information providing device 1. The meta-ID selection unit 12 may skip transmitting the first meta-ID to the user terminal 5.

<Content ID Selection Step S13>

Next, the content ID selection unit 13 looks up the reference database, and selects the first content ID, among a plurality of content IDs, based on the first meta-ID (content ID selection step S13). The content ID selection unit 13 acquires the first meta-ID selected by the meta-ID selection unit 12, and acquires the reference database stored in the storage unit 104. The content ID selection unit 13 may select one first content ID for a first meta-ID, or select, for example, a plurality of first content IDs for one first meta-ID. That is, the content ID selection unit 13 uses the first meta-ID as a search query, and selects a result that matches or partially matches with the search query, as the first content ID. The content ID selection unit 13 stores the selected first content IDs in the storage unit 104 via, for example, the memory unit 17.

<Reference Information Selection Step S14>

Next, the reference information selection unit 14 looks up the reference database, and selects first reference information, among a plurality of items of reference information, based on the first content ID (reference information selection step S14). The reference information selection unit 14 acquires the first content ID selected by the content ID selection unit 13, and acquires the reference database stored in the storage unit 104. The reference information selection unit 14 selects one item of first reference information corresponding to one first content ID. When the reference information selection unit 14 selects a plurality of first content IDs, the reference information selection unit 14 may select items of first reference information that correspond to the first content IDs respectively. By this means, a plurality of items of first reference information are selected. The reference information selection unit 14 stores the selected first reference information in the storage unit 104 via the memory unit 17, for example.

For example, the output unit 16 transmits the first reference information to the user terminal 5 and elsewhere. The user terminal 5 displays one or a plurality of selected items of first reference information on the display unit. The user can select one or a plurality of items of first reference information from the one or plurality of items of first reference information displayed. By this means, the user can identify one or a plurality of items of first reference information that carry the manuals and/or the like. In other words, one or more candidates of the first reference information suitable for the user are searched out from the image data of the instrumentation device 4, and the user can make selection from the one or more searched candidates for the first reference information, so that this is very useful as a fieldwork solution for users who use instrumentation devices 4 on site.

Note that the information providing device 1 may display the first reference information on the output part 109. With this, the operation of the information providing system 100 according to the present embodiment is finished.

According to the present embodiment, meta-IDs are linked with content IDs that correspond to reference information. By this means, when reference information is updated, it is only necessary to update the links between the content ID corresponding to the reference information and meta-IDs, or update the correspondence between the updated reference information and the content ID, so that it is not necessary to update the training data anew. By this means, it is not necessary to rebuild the meta-ID estimation processing database when reference information is updated. Therefore, databases can be built in a short time when reference information is updated.

Furthermore, according to the present embodiment, when building the meta-ID estimation processing database, machine learning can be implemented using meta-IDs that are smaller in volume than reference information. This makes it possible to build the meta-ID estimation processing database in a shorter time than when machine learning is implemented using reference information.

Also, according to the present embodiment, when searching for reference information, a meta-ID, which is smaller in volume than image data, is used as a search query, and a content ID, which is smaller in volume than reference information, is returned as a result to match or partially match with the search query, so that the amount of data to communicate in the search process and the processing time can be reduced.

Furthermore, according to the present embodiment, when creating a system for searching for reference information by using machine learning based on a data structure for machine learning, image data can be used as acquired data (input information) for use as search keywords. Consequently, the user does not need to verbalize the information or the specific instrumentation device that the user wants to search for, by way of character input or voice, so that the search is possible without the knowledge of the information, the name of the instrumentation device, and so on.

According to the present embodiment, apparatus meta-IDs are linked with apparatus IDs, and task procedure meta-IDs are linked with task procedure IDs. By this means, when selecting content IDs based on meta-IDs, it is possible to narrow down the target of content ID selection. Consequently, the accuracy of selection of content IDs can be improved.

According to the present embodiment, a meta-ID is linked with at least one content ID in a reference database, which, apart from the meta-ID estimation processing database, stores a plurality of items of reference information and content IDs. Therefore, it is not necessary to update the reference database when updating the meta-ID estimation processing database. Also, when updating the reference database, it is not necessary to update the meta-ID estimation processing database. By this means, the task of updating the meta-ID estimation processing database and the reference database can be performed in a short time.

According to the present embodiment, the reference information includes manuals for instrumentation devices 4. By this means, the user can immediately find the manual of the target instrumentation device. Consequently, the time for searching for manuals can be reduced.

According to the present embodiment, the reference information includes partial manuals, which are predetermined portions of manuals for instrumentation devices 4 that are divided. By this means, the user can find manuals that are prepared so that parts of interest in manuals are narrowed down. Consequently, the time for searching for parts of interest in manuals can be shortened.

According to the present embodiment, the reference information further includes incident information for instrumentation devices 4. This allows the user to learn about the incident information. Therefore, the user can make quick reactions to nearmiss accidents or accidents.

According to the present embodiment, the reference information includes process information that is acquired in instrumentation devices 4. This allows the user to check the state of measurement devices 4. Consequently, the user can perform, for example, inspection tasks for measurement devices 4, in a short time.

According to the present embodiment, the evaluation target information further includes incident information for instrumentation devices 4. This allows the incident information to be taken into account when selecting first meta-IDs from the evaluation target information, so that the target for the selection of first meta-IDs can be narrowed down. Consequently, the accuracy of selection of first meta-IDs can be improved.

First Example of Variation of Information Providing Device 1

Figure 8:
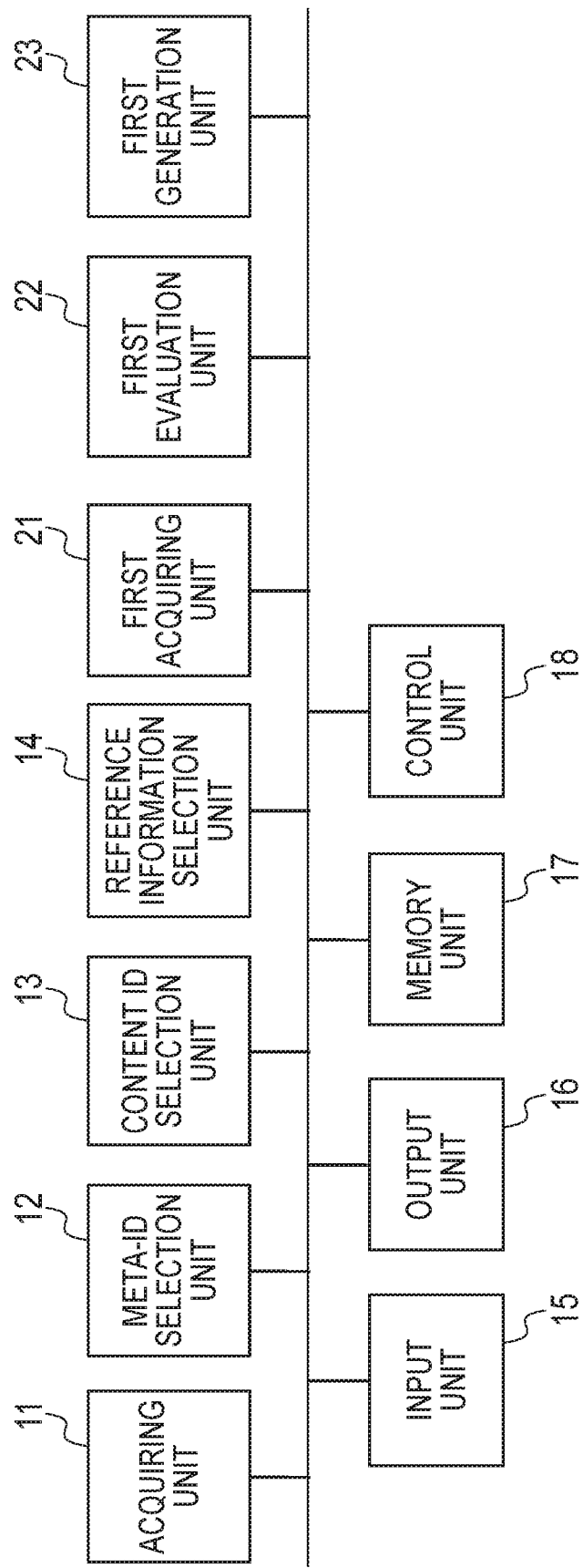
FIG. 8 is a schematic diagram to show an example of the first variation of functions of an information providing device according to the present embodiment.

Next, a first example of a variation of the information providing device 1 will be described. With this example of a variation, mainly, a first acquiring unit 21, a first evaluation unit 22, a first generation unit 23, an acquiring unit 11, a meta-ID selection unit 12, and a content ID selection unit 13 are different from the embodiment described above. Hereinafter, these differences will be primarily described. FIG. 8 is a schematic diagram to show the first example of a variation of functions of the information providing device 1 according to the present embodiment. Note that the functions shown in FIG. 8 are implemented when the CPU 101 runs programs stored in the storage unit 104 and elsewhere, by using the RAM 103 for the work area. Furthermore, each function may be controlled by, for example, artificial intelligence. Here, "artificial intelligence" may be based on any artificial intelligence technology that is known.

Figure 9:
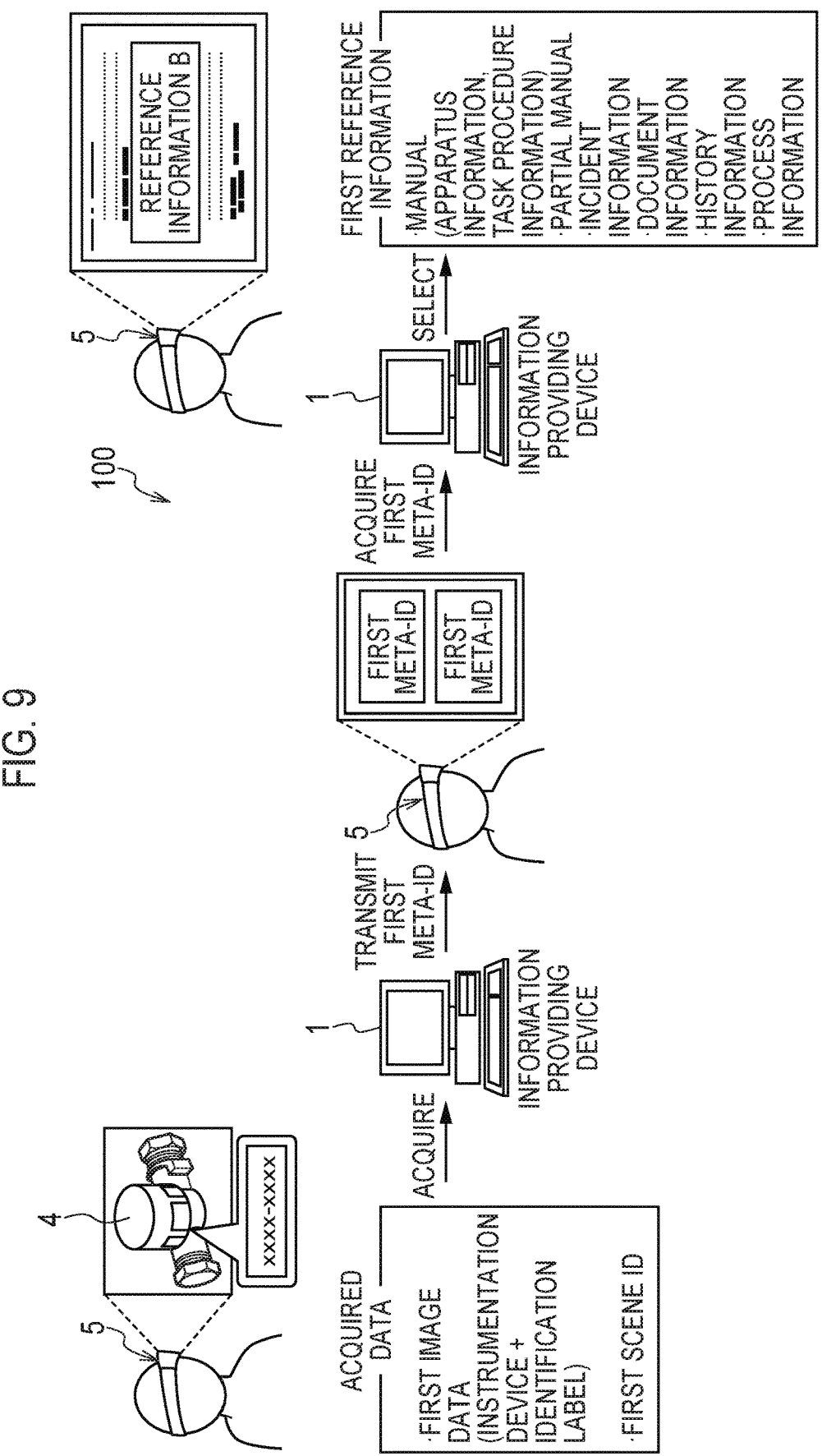
FIG. 9 is a schematic diagram to show an example of the first variation of the use of an information providing system according to the present embodiment.

FIG. 9 is a schematic diagram to show the first example of a variation of the use of the information providing system 100 according to the present embodiment. The information providing device 1 according to this example of a variation acquires data that carries first image data and a first scene ID as one pair. The information providing device 1 selects the first meta-ID based on the acquired data, and transmits the first meta-ID to the user terminal 5. Consequently, the information providing device 1 according to this example of a variation can further improve the accuracy of selection of first meta-IDs.

<First Acquiring Unit 21>

A first acquiring unit 21 acquires first video information. The first acquiring unit 21 acquires first video information from the user terminal 5. The first video information shows devices or parts, taken by the worker, or taken by using, for example, an HMD (Head-Mounted Display) or HoloLens. Video that is taken may be transmitted to the server 6 on a real time basis. Furthermore, video that is being taken may be acquired as first video information. The first video information includes, for example, video that is taken by the camera or the like of the user terminal 5 the user holds in the field. The first video information may be, for example, either a still image or a movie, may be taken by the user, or may be photographed automatically by the setting of the user terminal 5. Furthermore, the first video information may be read into the video information recorded in the memory of the user terminal 5 or elsewhere, or may be acquired via the public communication network 7.

<First Evaluation Unit 22>

A first evaluation unit 22 looks up the scene model database, and acquires a scene ID list, which includes the first degrees of scene association between first video information and scene information including scene IDs. The first evaluation unit 22 looks up the scene model database, selects past first video information that matches, partially matches, or is similar to the first video information acquired, selects scene information that includes the scene ID linked with the past first video information selected, and calculates the first degree of scene association based on the degree of scene association between the selected past first video information and the scene information. The first evaluation unit 22 acquires the scene ID including the first degree of scene association calculated, and displays the scene name list selected based on the scene ID list, on the user terminal 5.

Figure 10:
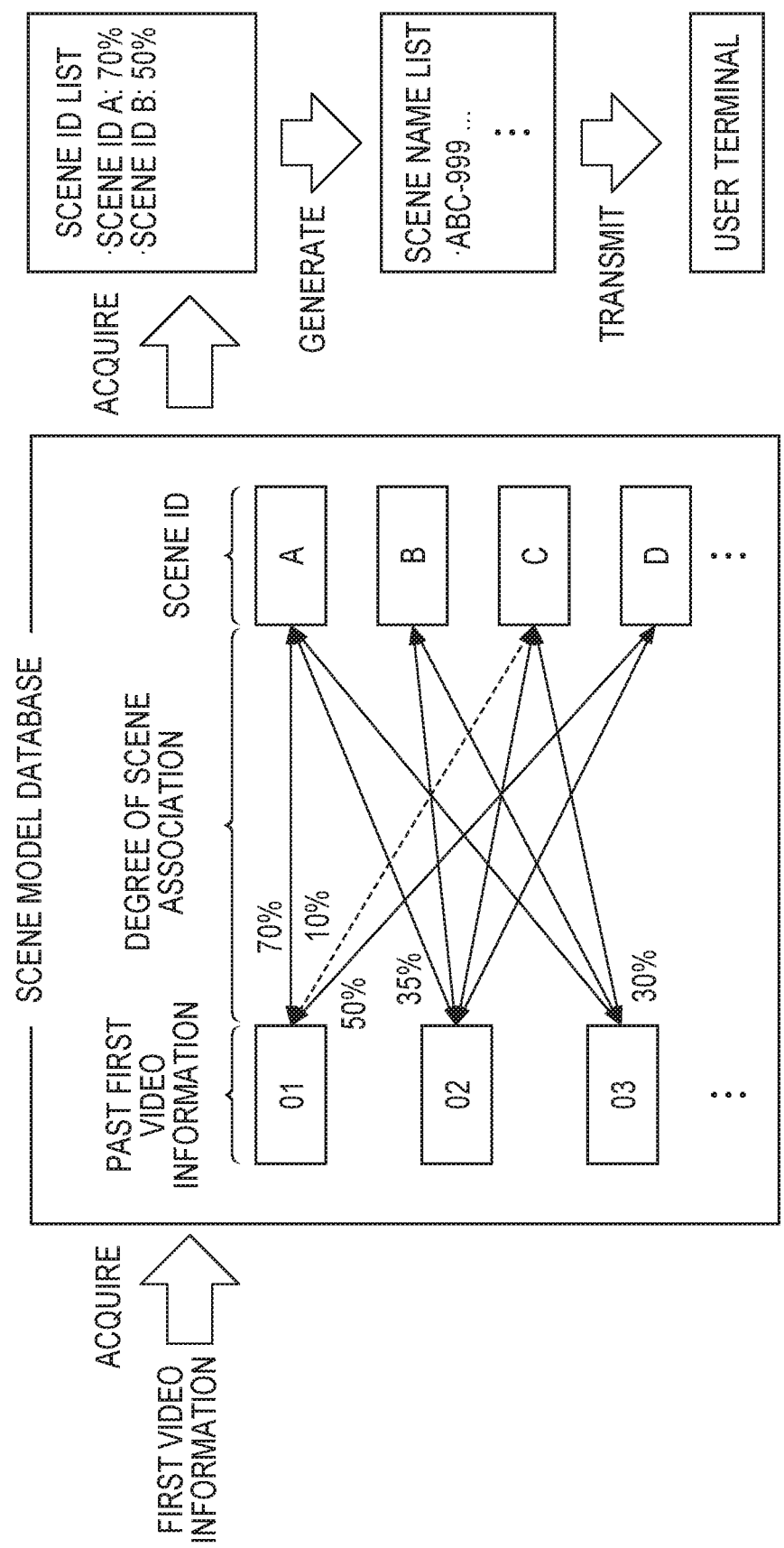
FIG. 10 is a schematic diagram to show an example of a scene model database according to the present embodiment.

FIG. 10 is a schematic diagram to show an example of a scene model database according to the present embodiment. The scene model database is stored in a storage unit 104. The scene model database stores past first video information, which is acquired in advance, scene information, which includes the scene IDs linked with the past first video information, and three or more levels of degrees of scene association, which represent the degrees of scene association between the past first video information and the scene information.

The scene model database is built on machine learning, based on an arbitrary model such as a neural network. The scene model database is built of the evaluation results of first video information, past first video information and scene IDs, which are acquired by machine learning, and for example, each relationship among these is stored as a degree of scene association. The degree of scene association shows how strongly past first video information and scene information are linked, so that, for example, it is possible to judge that the higher the degree of scene association, the more strongly the past first video information and the scene information are linked. The degree of scene association may be expressed in three or more values (three or more levels), such as percentages, or may be expressed in two values (two levels). For example, the past first video information "01" holds a degree of scene association of 70% with the scene ID "A", 50% with the scene ID "D", 10% with the scene ID "C", and so on, which are stored. Given first video information acquired from the user terminal 5, evaluation results of, for example, its similarity with past first video information, which is acquired in advance, are built by machine learning. For example, deep learning may be used, so that it is possible to deal with information that is not the same but is only similar.

The scene model database stores a scene ID list and a scene name list. The scene ID list shows, for example, the first degrees of scene association as calculated, and scene IDs. The scene model database stores contents, in which these evaluation results are listed. The contents of the list show, for example, scene IDs to show high degrees of scene association, such as "scene ID A: 70%", "scene ID B: 50%", and so on.

The scene name list is generated by a first generation unit 23, which will be described later. For example, scene names corresponding to scene IDs, acquired by the first evaluation unit 22, are stored in the scene ID list, and these are stored in the scene name list. The scene name list stored in the scene model database is transmitted to the user terminal 5 in later process. The user looks up the scene name list received in the user terminal 5, and finds out which scenes correspond to the first video information.

Note that, when there is no scene information that corresponds to the first video information or there is no scene name that corresponds to a scene ID in the scene model database, due to updating of the scene model database, correction and addition of registered data and so forth, a process of acquiring first video information in another field of view may be performed, or scene information or scene IDs that are provided as alternatives for when there is no matching scene information or scene name may be newly associated, and a scene name list may be generated with the additionally associated alternative scenes and transmitted to the user terminal 5.

<First Generation Unit 23>

A first generation unit 23 generates a scene name list that corresponds to the scene ID list acquired in the first evaluation unit 22. The scene name list to be generated includes, for example, "scene ID", "degree of scene association", and so forth.

The scene IDs are associated with, for example, the scene model table shown in FIG. 11 and the scene content model table (OFE) shown in FIG. 12. For example, scene IDs, training models and so forth are stored in the scene model table, and content IDs, training models and so on are stored in the scene content model table. The first generation unit 23 generates a scene name list based on these items of information.

The scene model table shown in FIG. 11 is stored in the scene model database. For example, scene IDs that identify each task to be performed by the user in the field and training models corresponding to these scene IDs are associated with each other and stored in the scene model table. A plurality of scene IDs are present, and stored in association with the training models of video information corresponding to each of those scene IDs.

Next, in the scene content model table shown in FIG. 12, each scene ID's content ID and training model are associated and stored. The scene content model table shown in FIG. 12 shows, for example, an example in which the scene ID is "OFE", and in which content IDs to correspond to a variety of scenes are stored separately. A plurality of content IDs are present, and stored in association with the training models of video information corresponding to each of those scenes. Note that the content IDs may include contents with no specified scenes. In this case, "NULL" is stored for the content ID.

Next, FIG. 13 is a schematic diagram to show an example of a scene table. The scene table shown in FIG. 13 is stored in the scene model database. For example, a summary of video information of each task the user performs in the field, and a scene ID to identify the task of that summary are associated with each other and stored. A plurality of scene IDs are present, with each scene ID being stored in association with a corresponding scene name.

<Acquiring Unit 11>

The acquiring unit 11 acquires data that carries first image data and a first scene ID, corresponding to a scene name selected from the scene name list, as one pair.

<Meta-ID Selection Unit 12>

Figure 14:
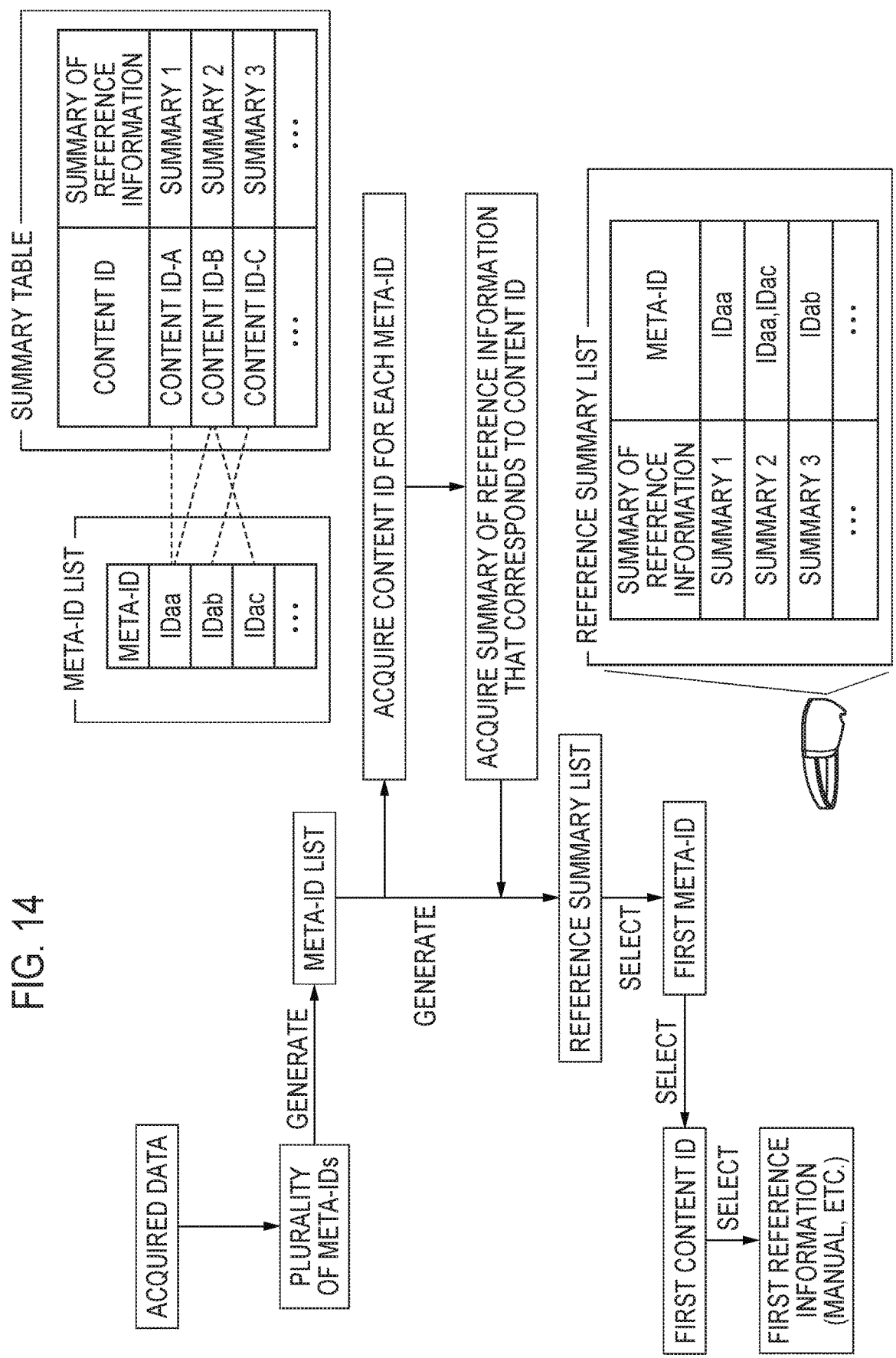
FIG. 14 is a schematic diagram to show an example of a variation of the use of an information providing system according to the present embodiment.

FIG. 14 is a schematic diagram to show a variation of the use of an information providing system according to the present embodiment. The meta-ID selection unit 12 looks up the meta-ID estimation processing database, extracts a plurality of meta-IDs based on the acquired data, and generates a meta-ID list including these meta-IDs. A plurality of meta-IDs are listed in the meta-ID list. The meta-ID selection unit 12 generates a reference summary list that corresponds to the meta-ID list. To be more specific, the meta-ID selection unit 12 looks up the content database, and acquires the content IDs linked with respective meta-IDs included in the meta-ID list generated.

Figure 15:
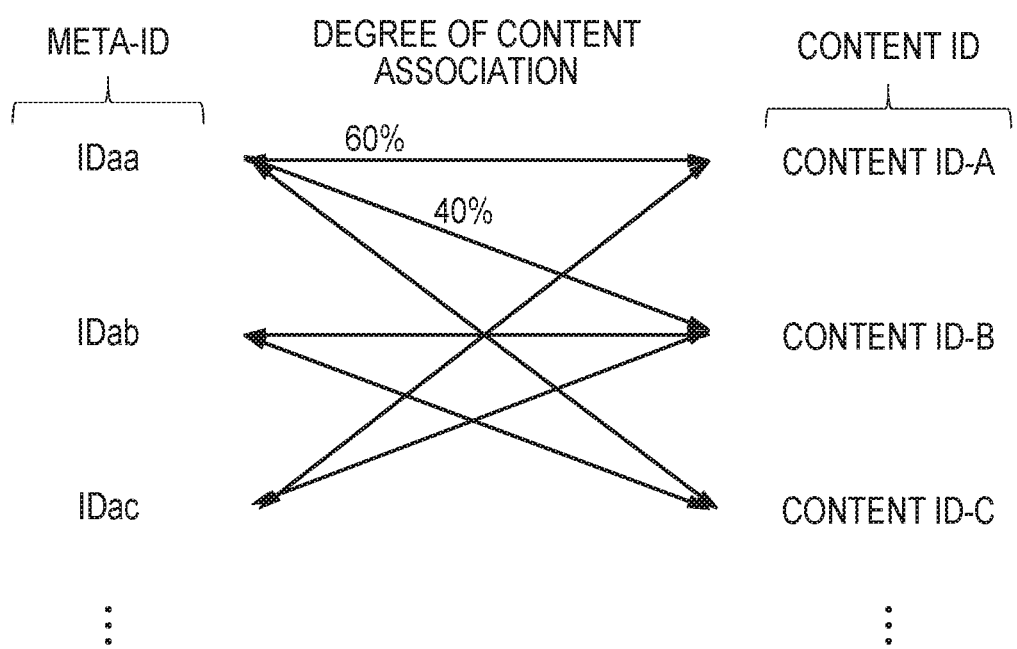
FIG. 15 is a schematic diagram to show an example of a content database according to the present embodiment.

FIG. 15 is a schematic diagram to show an example of the content model database. The content database may store meta-IDs, content IDs, and the degrees of content association between meta-IDs and content IDs. A degree of content association shows how strongly a meta-ID and a content ID are linked, and is expressed, for example, in percentage, or in three or more levels, such as ten levels, five levels, and so on. For example, in FIG. 15, "IDaa" included in the meta-IDs shows its degree of association with "content ID-A" included in the content IDs, which is "60%", and shows its degree of association with "content ID-B", which is "40%". This means that "IDaa" is more strongly linked with "content ID-A" than with "content ID-B".

The content database may have, for example, an algorithm that can calculate the degree of content association. For example, a function (classifier) that is optimized based on meta-IDs, content IDs, and the degrees of content association may be used.

The content database is built by using, for example, machine learning. For the method of machine learning, for example, deep learning is used. The content database is, for example, built with a neural network, and, in that case, the degrees of association may be represented by hidden layers and weight variables.

The meta-ID selection unit 12 may look up the degrees of content association, and acquire content IDs linked with a plurality of meta-IDs included in the meta-ID list. For example, the meta-ID selection unit 12 may acquire, from a meta-ID, content IDs having high degrees of content association.

The meta-ID selection unit 12 looks up a summary table, and acquires summaries of reference information that correspond to the acquired content IDs. FIG. 16 shows an example of the summary table. The summary table includes a plurality of content IDs and summaries of reference information corresponding to the content IDs. The summary table is stored in the storage unit 104. The summaries of reference information show summarized contents of reference information and so forth.

The meta-ID selection unit 12 generates a reference summary list, based on the summaries of reference information acquired. FIG. 17 shows an example of the reference summary list. The reference summary list includes a plurality of summaries of reference information, and meta-IDs that correspond to the summaries of reference information. The meta-ID selection unit 12 transmits the reference summary list to the user terminal 5. The user terminal 5 selects a summary of reference information from the reference summary list transmitted, selects the meta-ID from the selected summary of reference information, and transmits the selected meta-ID to the information providing device 1. Then, the meta-ID selection unit 12 selects the meta-IDs, selected from the reference summary list by the user terminal 5, as first meta-IDs.

<Content ID Selection Unit 13>

The content ID selection unit 13 looks up the reference database and the content database, and selects first content IDs, from a plurality of content IDs, based on the first meta-ID. For example, when the content database shown in FIG. 14 is used, the content ID selection unit 13 selects the content IDs (for example, "content ID-A", "content ID-B", etc.) that are linked with the first meta-ID "IDaa", as first content IDs. In this case, "content ID-A", which shows a high degree of content association (for example, a degree of content association of 60%), may be selected. A threshold for the degree of content association may be set in advance, and content IDs having higher degrees of content association than the threshold may be selected as first content IDs.

First Example of Variation of Operation of Information Providing System 100

Figure 18:
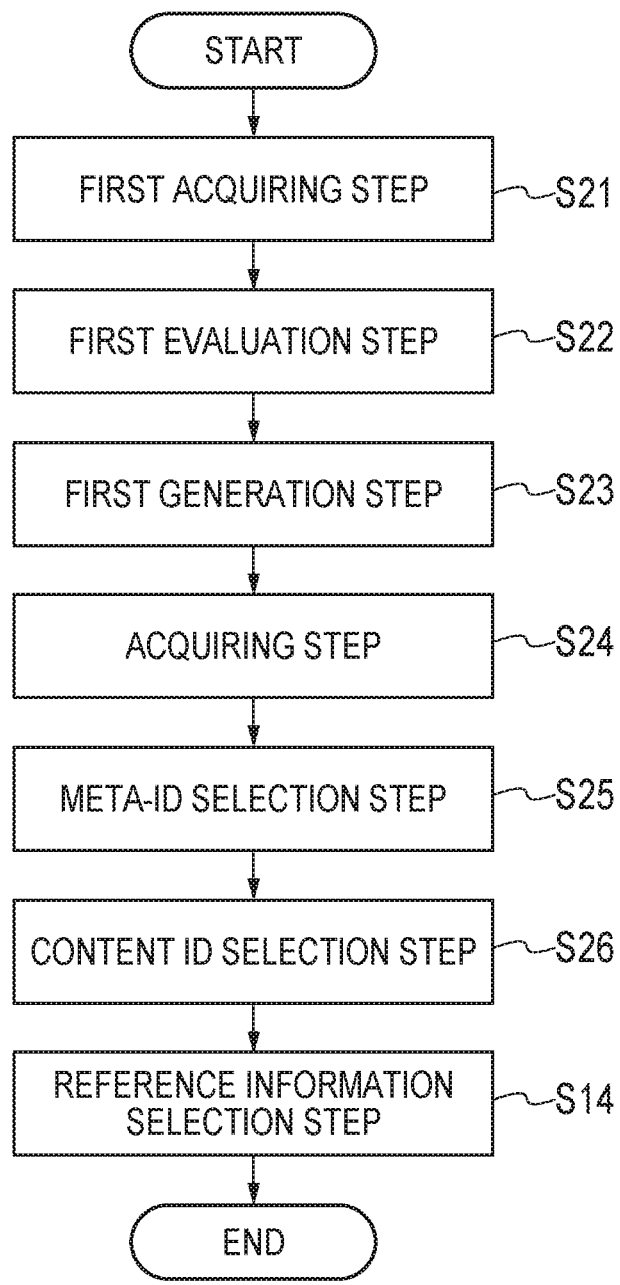
FIG. 18 is a flowchart to show an example of a variation of the operation of an information providing system according to the present embodiment.

Next, a first example of a variation of the operation of the information providing system 1 according to the present embodiment will be described. FIG. 18 is a flow chart to show the first example of a variation of the operation of the information providing system 100 according to the present embodiment.

<First Acquiring Step S21>

First, the first acquiring unit 21 acquires first video information from the user terminal 5 (first acquiring step S21). The first acquiring unit 21 acquires the first video information, which is video information of a specific instrumentation device 4 taken by the user terminal 5.

<First Evaluation Step S22>

Next, the first evaluation unit 22 looks up the scene model database and acquires a scene ID list, which includes the first degrees of scene association between the acquired first video information and scene information (first evaluation step S22).

<First Generation Step S23>

Next, the first generation unit 23 generates a scene name list, which corresponds to the scene ID list acquired in the first evaluation unit 22 (first generation step S23). The first generation unit 23 looks up, for example, the scene table shown in FIG. 13, and generates a scene name list that corresponds to the scene ID list acquired. For example, if the scene ID "OFD" is included in the scene ID list acquired in the first evaluation unit 22, the scene name "Restart ABC-999 Device" is selected as the scene name. For example, when the scene ID is "OFE", the scene name "Remove Memory from ABC-999 Device" is then selected as the scene name.

<Acquiring Step S24>

Next, the acquiring unit 11 acquires data that carries first image data, and a first scene ID, corresponding to a scene name selected from the scene name list, as one pair (acquiring step S24). The scene ID corresponding to the scene name selected from the scene name list is the first scene ID.

<Meta-ID Selection Step S25>

The meta-ID selection unit 12 extracts a plurality of meta-IDs based on the acquired data, and generates a meta-ID list including these meta-IDs (meta-ID selection step S25). The meta-ID selection unit 12 generates a reference summary list that corresponds to the meta-ID list. The meta-ID selection unit 12 transmits the generated reference summary list to the user terminal 5. Then, the user terminal 5 selects, from the reference summary list transmitted, one or more summaries of reference information and meta-IDs corresponding to the summaries of reference information. The user terminal 5 transmits the selected summaries of reference information and meta-IDs to the information providing device 1. Then, the meta-ID selection unit 12 selects the meta-IDs, selected from the reference summary list by the user terminal 5, as first meta-IDs.

<Content ID Selection Step S26>

Next, the content ID selection unit 13 looks up the reference database and the content database, and selects first content IDs, among a plurality of content IDs, based on the first meta-IDs (content ID selection step S26). The content ID selection unit 13 acquires the first meta-IDs selected by the meta-ID selection unit 12, and acquires the reference database and the content database stored in the storage unit 104. The content ID selection unit 13 may select one first content ID for a first meta-ID, or select, for example, a plurality of first content IDs for one first meta-ID. The content ID selection unit 13 stores the selected first content IDs in the storage unit 104 via, for example, the memory unit 17.

After that, the above-described reference information selection step S14 is performed, and the operation is finished.

According to this example of a variation, the meta-ID selection unit 12 extracts a plurality of first meta-IDs from a plurality of meta-IDs, generates a meta-ID list including a plurality of first meta-IDs, generates a reference summary list that corresponds to the meta-ID list, and selects first meta-IDs selected from the reference summary list. By this means, first meta-IDs can be selected based on the reference summary list. Consequently, the accuracy of selection of first meta-IDs can be improved.

According to this example of a variation, the acquiring unit 11 acquires data that carries first image data, and a first scene ID, corresponding to a scene name selected from the scene name list, as one pair. By this means, meta-IDs can be selected by taking into account the first scene IDs. Consequently, the accuracy of selection of meta-IDs can be improved.

According to this example of a variation, the content ID selection unit 13 looks up the reference database and the content database, and selects first content IDs, from a plurality of content IDs, based on first meta-IDs. By this means, when selecting content IDs based on meta-IDs, it is possible to further narrow down the target of content ID selection based on the degrees of content association. Consequently, the accuracy of selection of first content IDs can be improved.

Figure 19:
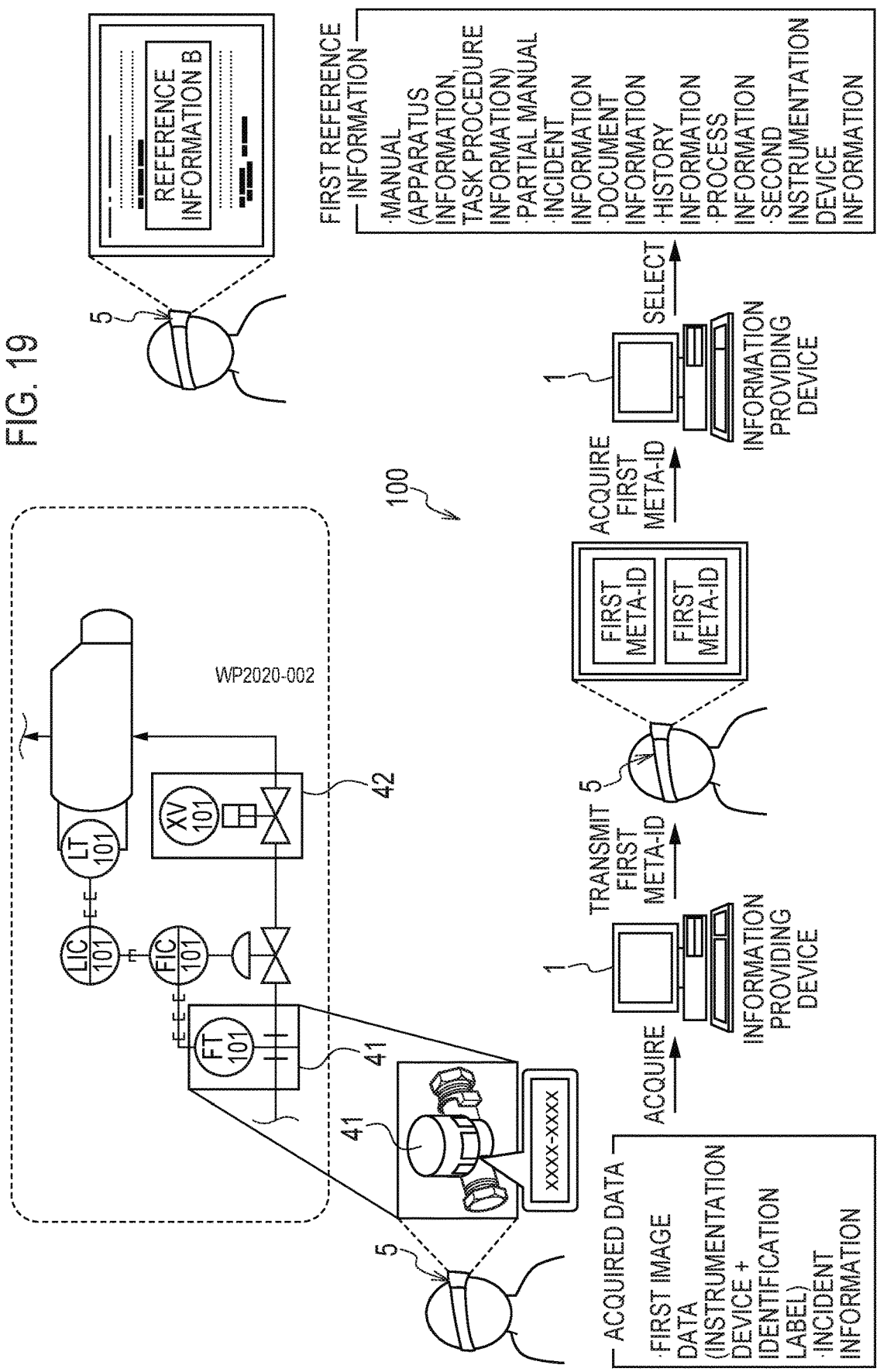
FIG. 19 is a schematic diagram to show an example of a variation of the use of an information providing system according to the present embodiment.

FIG. 19 is a schematic diagram to show an example of a variation of the use of the information providing system 100 according to the present embodiment. The instrumentation devices 41 and 42 are, for example, instrumentation devices installed in plants, factories and so forth, and connected with each other in process P.

The information providing device 1 acquires data that carries first image data of the instrumentation device 41. The information providing device 1 selects the first meta-ID based on the acquired data, and transmits the first meta-ID to the user terminal 5. The information providing device 1 acquires the first meta-ID from the user terminal 5. The information providing device 1 selects first reference information based on the first meta-ID acquired, and transmits the first reference information to the user terminal 5.

In this case, the reference information may include second instrumentation device information that relates to another instrumentation device 42 connected within the same process P as that of the instrumentation device 41. The second reference information includes, for example, the manual, partial manuals, incident information, document information, history information, process information and so forth, of the other instrumentation device 42.

In this case, the reference information may include second instrumentation device information that relates to another instrumentation device 42 connected within the same process P as that of the instrumentation device 41. By this means, the user can find information pertaining to another instrumentation device 42 in the same process P as that of the instrumentation device 41. Consequently, the user can perform, for example, inspection tasks for the process P, in a short time.

According to the present embodiment, the second instrumentation device information includes process information acquired from another instrumentation device 42 that is connected within the same process P as that of the instrumentation device 41. By this means, the user can find measurement information pertaining to another measurement device 42. Consequently, the user can perform, for example, inspection tasks and so forth for another instrumentation device 42, in a short time.

According to the above-described embodiment, the instrumentation device 4 is illustrated as an example of apparatus, but the apparatus may be, for example, a medical device, a nursing care device, a construction machine, a machine tool, an agricultural machine, a transportation machine, a robot, and so forth.

<Medical Device>

In the event the apparatus refers to medical devices, the information providing system 100 is used by users such as healthcare practitioners, including clinical engineers who use medical devices. The information providing system 100 is used primarily for medical devices, which are used by healthcare practitioners such as clinical engineers. The information providing system 100 selects, from acquired data that carries image data of a medical device, first reference information that is appropriate when a user to perform a task related to the medical device works on the task. The information providing system 100 can provide, for example, a manual of the medical device to the user, and, in addition, provide incident information related to the medical device, for example, to the user. By this means, the user can check the manual of the medical device, learn about incidents related to the medical device, and so forth.

The medical devices, as used herein, include specially-controlled medical devices such as, for example, pacemakers, coronary stents, artificial blood vessels, PTCA catheters, central venous catheters, absorbable internal fixation bolts, particle beam therapy apparatus, artificial dialyzers, epidural catheters, infusion pumps, automatic peritoneal perfusion apparatus, artificial bones, artificial heart-lung machines, multi-person dialysate supply machines, apheresis apparatus, artificial respirators, programs and so forth (corresponding to the classifications of "class III" and "class IV" by GHTF (Global Harmonization Task Force)). The medical devices also include controlled medical devices such as, for example, X-ray imaging apparatus, electrocardiographs, ultrasound diagnostic apparatus, injection needles, blood collection needles, vacuum blood collection tubes, infusion sets for infusion pumps, Foley catheters, suction catheters, hearing aids, home massagers, condoms, programs and so forth (corresponding to the classification of "class II" by GHTF). The medical devices also include general medical devices such as, for example, enteral feeding sets, nebulizers, X-ray films, blood gas analyzers, surgical nonwoven fabrics, programs and so forth (corresponding to the classification of "class I" by GHTF). The medical devices not only include medical devices that are defined by laws and regulations, but also include mechanical devices (beds, for example) and the like that are similar to medical devices in appearance and structures but are not defined by laws and regulations. The medical devices may be devices that are used at sites of medical practice such as hospitals, including medical information devices that store patients' medical records and electronic medical records, information devices that store information about the staff in hospitals, and so forth.

<Nursing Care Device>

In the event the apparatus refers to nursing care devices, the information providing system 100 is used by users such as nursing practitioners, including caregivers who use nursing care devices. The information providing system 100 is used primarily for nursing care devices, which are used by nursing practitioners such as caregivers. The information providing system 100 selects, from acquired data that carries image data of a nursing care device, first reference information that is appropriate when a user to perform a task related to the nursing care device works on the task. The information providing system 100 can provide, for example, a manual of the nursing care device to the user, and, in addition, provide incident information related to the nursing care device, for example, to the user. By this means, the user can check the manual of the nursing care device, learn about incidents related to the nursing care device, and so forth.

The nursing care devices, as used herein, include ones that relate to movement indoors and outdoors, such as, for example, wheelchairs, walking sticks, slopes, handrails, walkers, walking aids, devices for detecting wandering elderly people with dementia, and moving lifts. The nursing care devices also include ones that relate to bathing, such as, for example, bathroom lifts, bath basins, handrails for bathtub, handrails in bathtub, bathroom scales, bathtub chairs, bathtub scales, bathing assistance belts, and portable bathtubs. The nursing care devices also include ones that relate to bowel movement, such as, for example, disposable diapers, automatic waste cleaning apparatus, and stool toilet seats. The nursing care devices also include ones that relate to bedding, such as, for example, care beds including electric beds, bed pads, bedsore prevention mats, and posture changers. The nursing care devices not only include nursing care devices that are defined by laws and regulations, but also include mechanical devices (beds, for example) and the like that are similar to nursing care devices in appearance and structures but are not defined by laws and regulations. The nursing care devices include welfare tools. The nursing care devices may be ones for use at care sites such as nursing facilities, and include care-related information management systems that store information on care recipients and information about the staff in nursing facilities.

<Construction Machine>

In the event the apparatus refers to construction machines, the information providing system 100 is used by users such as construction workers who use construction machines. The information providing system 100 is used primarily for construction machines, which are used by construction workers and the like. The information providing system 100 selects, from acquired data that carries image data of a construction machine, first reference information that is appropriate when a user to perform a task related to the construction machine works on the task. The information providing system 100 can provide, for example, a manual of the construction machine to the user, and, in addition, provide incident information related to the construction machine, for example, to the user. By this means, the user can check the manual of the construction machine, learn about incidents related to the construction machine, and so forth.

The construction machine may be a general construction machine such as, for example, a bulldozer, an excavator, a crane, a machine for foundation work, a machine for tunnel construction, a motor grader, a compaction machine, a concrete machine, a pavement machine, a road maintenance machine, an air compressor, a pump, a winch, temporary equipment for temporary construction, and/or the like. The construction machine may be a construction machine for constructing ports, rivers, and seacoasts such as a working ship, a floating crane, and/or the like.

<Machine Tool>

In the event the apparatus refers to machine tools, the information providing system 100 is used by users who use machine tools. The information providing system 100 is used primarily for machine tools, which are used by users. The information providing system 100 selects, from acquired data that carries image data of a machine tool, first reference information that is appropriate when a user to perform a task related to the machine tool works on the task. The information providing system 100 can provide, for example, a manual of the machine tool to the user, and, in addition, provide incident information related to the machine tool, for example, to the user. By this means, the user can check the manual of the machine tool, learn about incidents related to the machine tool, and so forth.

The machine tool may be, for example, a lathe, a milling machine, a shaping machine, a planing machine, a drilling machine, a boring machine, electric discharge machine, and/or the like.

<Agricultural Machine>

In the event the apparatus refers to agricultural machines, the information providing system 100 is used by users such as agricultural workers who use agricultural machines, and/ or the like. The information providing system 100 is used primarily for agricultural machines, which are used by agricultural workers. The information providing system 100 selects, from acquired data that carries image data of an instrumentation device 4, first reference information that is appropriate when a user to perform a task related to the agricultural machine works on the task. The information providing system 100 can provide, for example, a manual of the agricultural machine to the user, and, in addition, provide incident information related to the agricultural machine, for example, to the user. By this means, the user can check the manual of the agricultural machine, learn about incidents related to the agricultural machine, and so forth.

The agricultural machine may be, for example, a riding agricultural machine, such as a riding tractor, a riding rice transplanter, a riding combine, and/or the like. The agricultural machine may be a walking-type agricultural machine such as a walking-type tractor or a walking-type tending machine. The agricultural machine may be a stationary machine such as a grain dryer or a rice huller. The agricultural machine may be a portable agricultural machine such as a bush cutter, a power plucker, a hedge trimmer, a backpack power sprayer, a backpack power duster, a chain saw, and/or the like.

<Transportation Machine>

In the event the device refers to transportation machines, the information providing system 100 is used by users who use transportation machines. The information providing system 100 is used primarily for transportation machines, which are used by users. The information providing system 100 selects, from acquired data that carries image data of a transportation machine, first reference information that is appropriate when a user to perform a task related to the transportation machine works on the task. The information providing system 100 can provide, for example, a manual of the transportation machine to the user, and, in addition, provide incident information related to the transportation machine, for example, to the user. By this means, the user can check the manual of the transportation machine, learn about incidents related to the transportation machine, and so forth.

The transport machine may be, for example, an automobile, a ship, an aircraft, and/or the like. Also, the information providing system 100 may be used upon automatic driving of an automobile or the like.

<Robot>

In the event the apparatus refers to robots, the information providing system 100 is used by users who use robots. The information providing system 100 is used primarily for robots, which are used by users. The information providing system 100 selects, from acquired data that carries image data of a robot, first reference information that is appropriate when a user to perform a task related to the robot works on the task. The information providing system 100 can provide, for example, a manual of the robot to the user, and, in addition, provide incident information related to the robot, for example, to the user. By this means, the user can check the manual of the robot, learn about incidents related to the robot, and so forth.

The robot may be a humanoid robot, an animal-type robot, and so forth. The robot may be an industrial robot that performs work on behalf of a human.

Second Example of Variation of Information Providing Device 1

Figure 20:
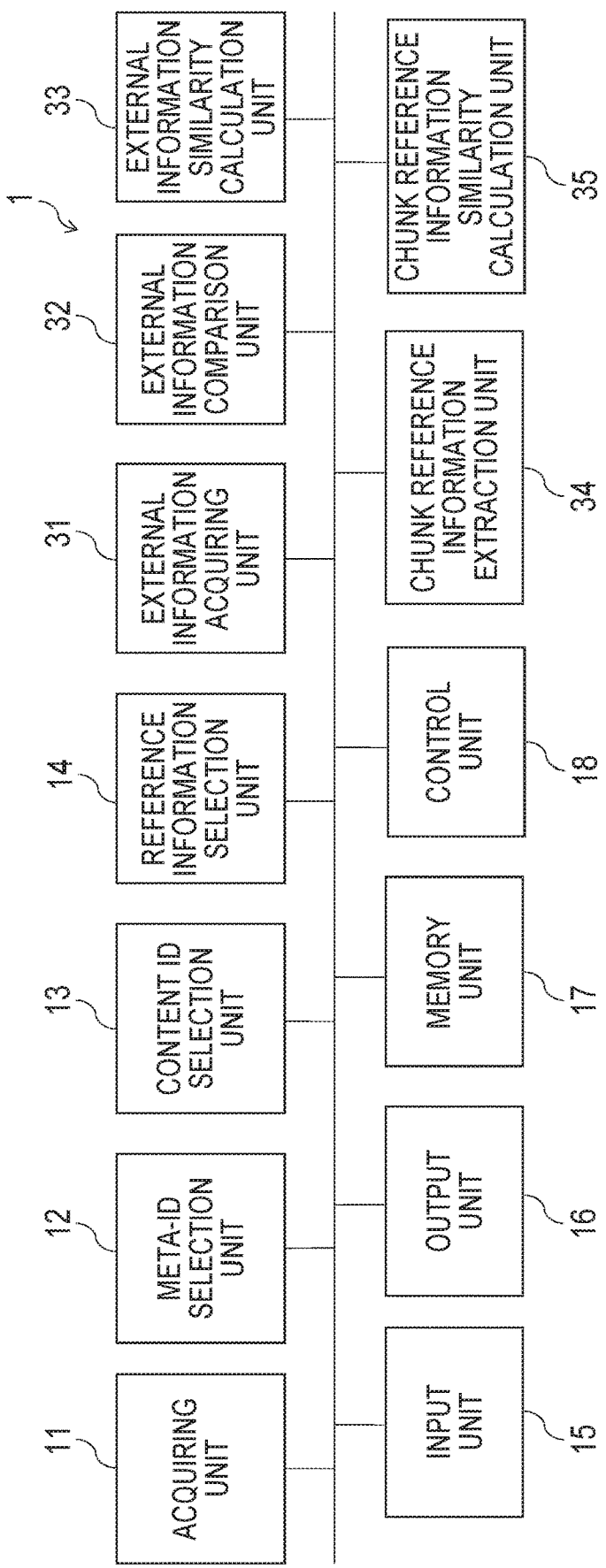
FIG. 20 is a schematic diagram to show a second example of a variation of functions of an information providing device according to the present embodiment.

Next, a second example of a variation of the information providing device 1 will be described. This example of a variation is different from the above-described embodiment primarily in that an external information acquiring unit 31, an external information comparison unit 32, an external information similarity calculation unit 33, a chunk reference information extraction unit 34, and a chunk reference information similarity calculation unit 35 are additionally provided. Furthermore, this example of a variation is different from the above-described embodiment in that a content association database, an external information similarity calculation database and a chunk reference information similarity estimation processing database are additionally stored in the storage unit 104. Hereinafter, these differences will be primarily described. FIG. 20 is a schematic diagram to show a second example of a variation of functions of the information providing device 1 according to the present embodiment. Note that the functions shown in FIG. 20 are implemented when the CPU 101 runs programs stored in the storage unit 104 and elsewhere, by using the RAM 103 for the work area. Furthermore, each function may be controlled by, for example, artificial intelligence. Here, "artificial intelligence" may be based on any artificial intelligence technology that is known.

Figure 21:
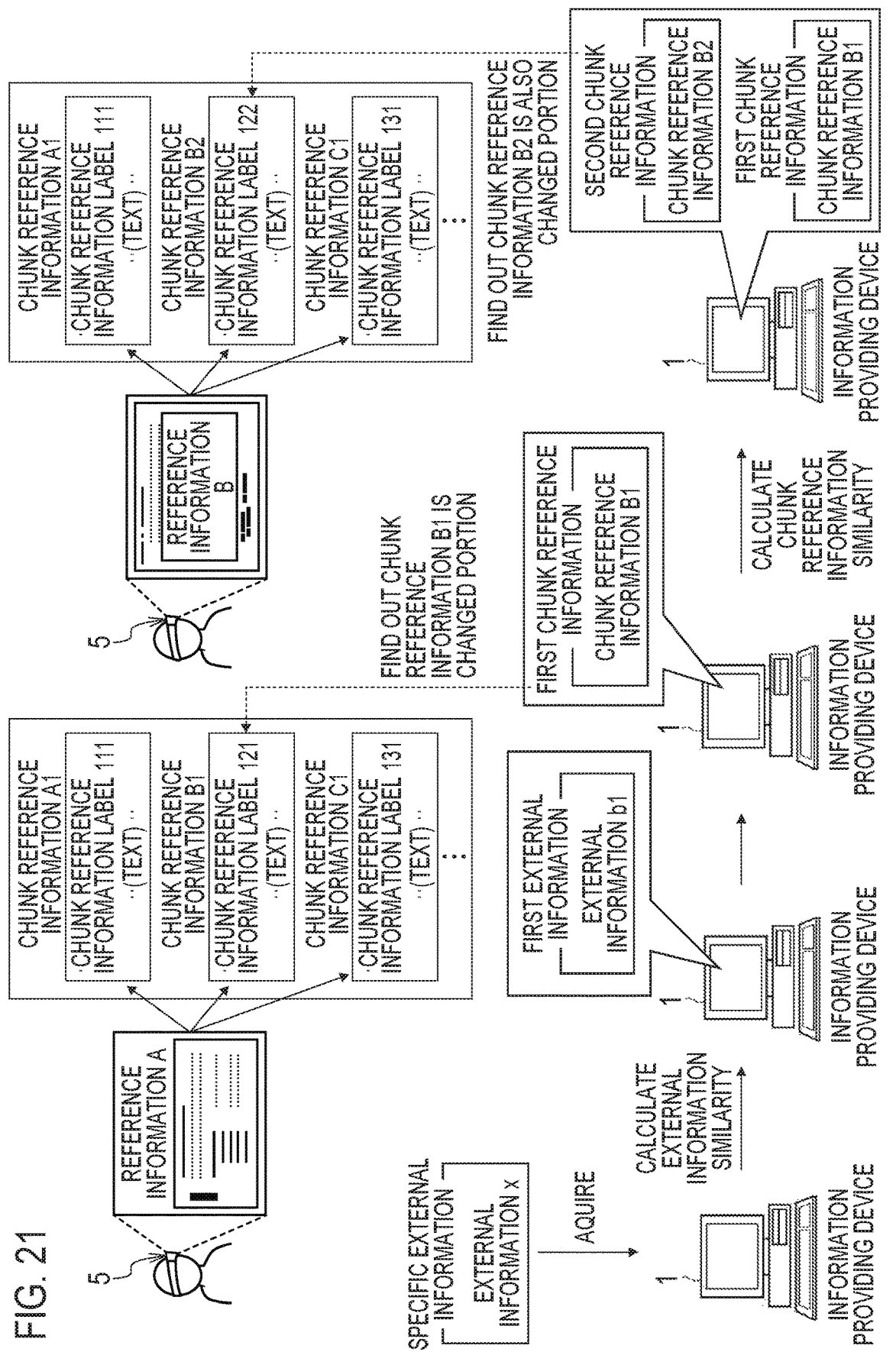
FIG. 21 is a schematic diagram to show a second example of a variation of the use of an information providing system according to the present embodiment.

FIG. 21 is a schematic diagram to show a second example of a variation of the use of the information providing system 100 according to the present embodiment. The information providing device 1 according to this example of a variation acquires specific external information x. The information providing device 1 calculates the external information similarity for specific external information x acquired. Based on the external information similarities calculated, the information providing device 1 selects first external information b1 from among a plurality of items of external information. The information providing device 1 looks up the content association database, and extracts chunk reference information B1 that corresponds to the selected first external information b1, as first chunk reference information B1. By this means, it is possible to find out that chunk reference information B1, corresponding to external information b1 that is similar to specific external information x acquired, is a portion changed based on specific external information x. Consequently, when reference information is updated for editing and/or the like, only first chunk reference information B1 needs to be updated, so that the task of updating the reference information can be performed in a short time.

Furthermore, the information providing device 1 looks up the chunk reference information similarity estimation processing database, and calculates the chunk reference information similarity for first chunk reference information B1. The information providing device 1 extracts second chunk reference information B2, apart from first chunk reference information B1, based on chunk reference information similarities calculated. Accordingly, it is possible to find out that second chunk reference information B2, which is similar to first chunk reference information B1, is also a portion changed based on specific external information x. Therefore, when updating reference information for editing and/or the like, it is only necessary to update the first chunk reference information and the second chunk reference information, so that the task of updating the reference information can be performed in a short time.

<Content Association Database>

Figure 22:
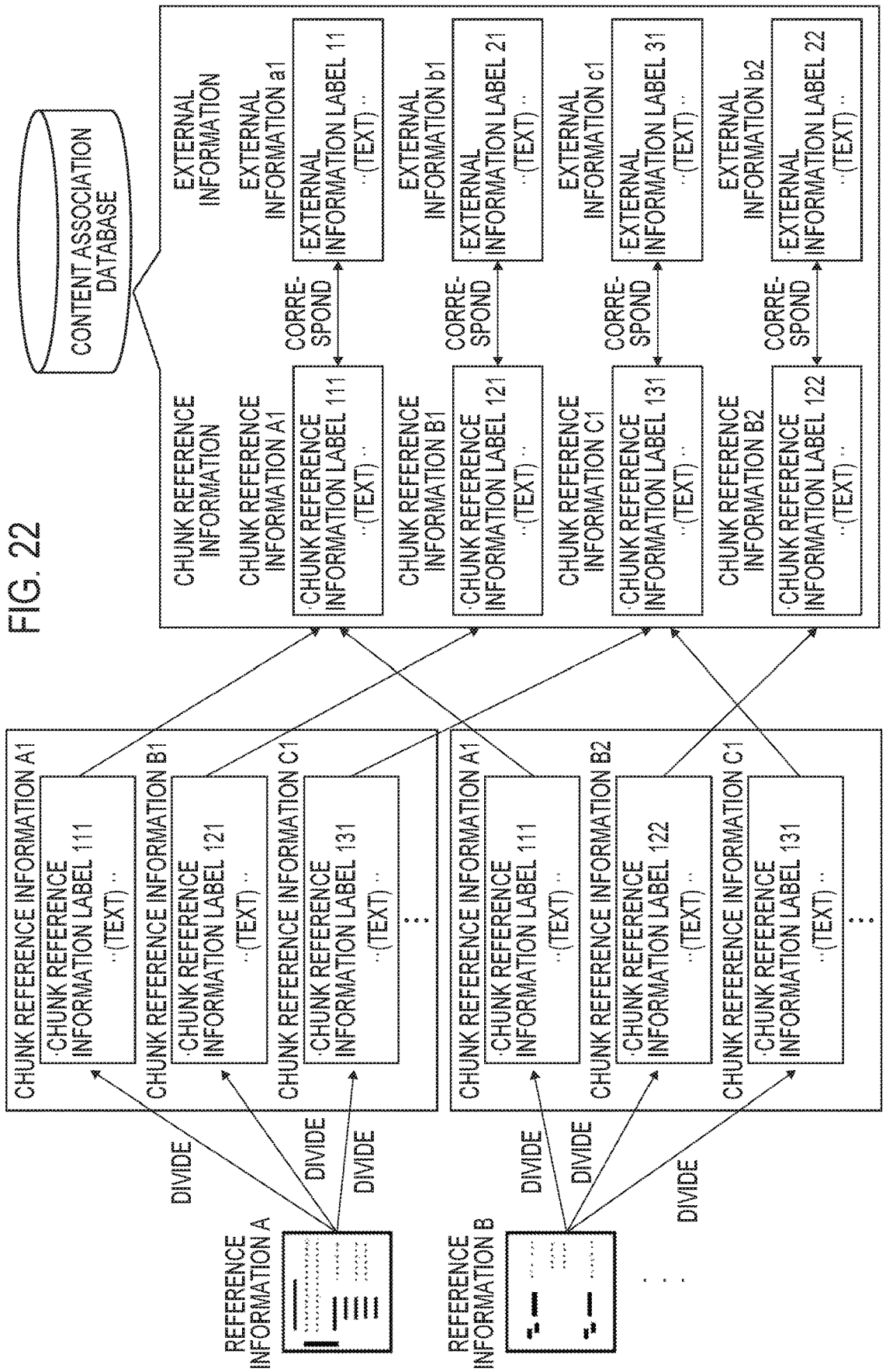
FIG. 22 is a schematic diagram to show an example of a content association database.

FIG. 22 is a schematic diagram to show an example of the content association database. In the content association database, multiple items of chunk reference information, in which reference information divided into a chunk structure, and the external information that is used to create the chunk reference information are stored.

The chunk reference information includes text information. The chunk reference information may also include chart information. The chunk reference information may include chunk reference information labels, which consist of character strings for identifying the chunk reference information. For example, if the reference information is a manual for a device such as an instrumentation device, the chunk reference information is then information, in which this manual is divided into a chunk structure, where meaningful information constitutes a chunk of a data block. The chunk reference information is information that is divided, based on a chunk structure, for example, per sentence of the manual, or per chapter, per paragraph, per page, and so forth.

The external information includes text information. The external information may also include chart information. The external information may include external information labels, which consist of character strings for identifying the chunk reference information. The external information corresponds to the chunk reference information on a one-to-one basis, and is stored in the content association database. For example, if there is reference information that is a manual for a device such as a measurement device, the external information is then information in which the specifications and/or other materials used to create this manual are divided into a chunk structure with a chunk of a data block. The external information is information that is divided, based on a chunk structure, for example, per sentence of the specification, or per chapter, per paragraph, per page, and so forth. The external information may be a specification divided into a chunk structure so as to serve as information for creating reference information, and, may be, for example, information divided into a chunk structure, such as incident information, various papers, information that is the source of the reference information, and so on. Furthermore, when the chunk reference information is created in a first language such as Japanese, the external information may be created in a second language that is different from the first language, such as English.

Figure 23A:
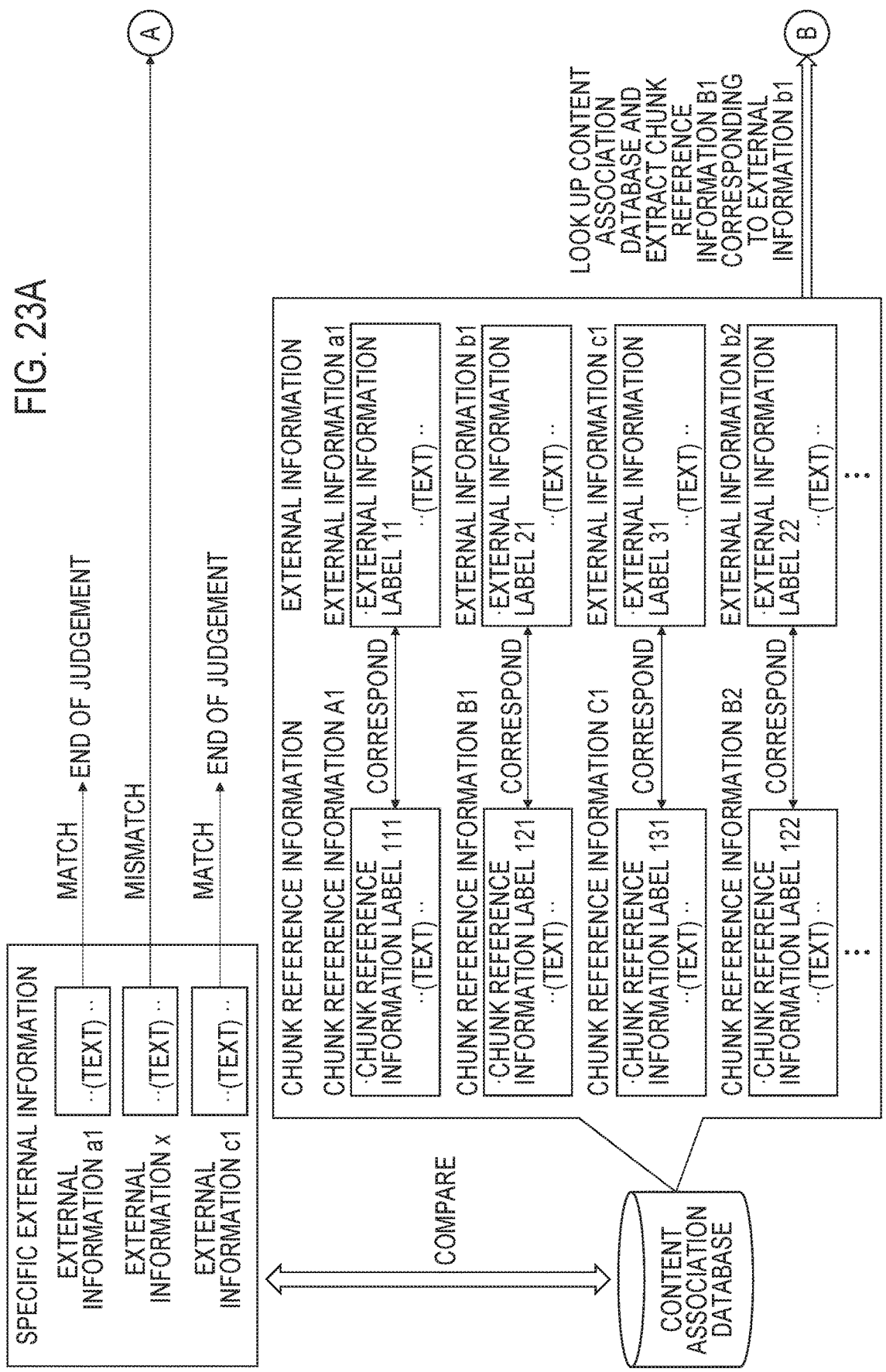
FIG. 23A is a schematic diagram to show an example of a content association database.
Figure 23B:
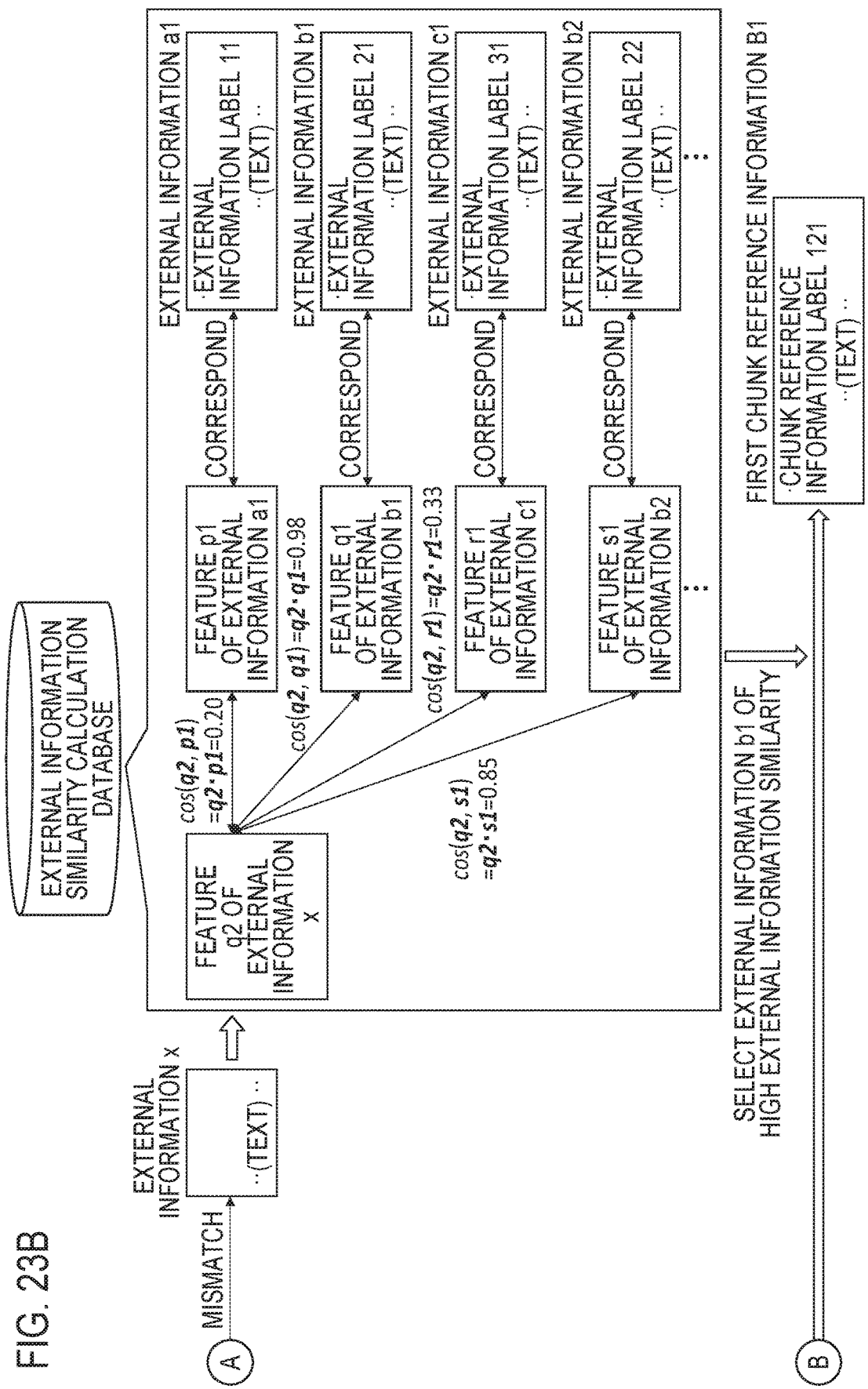
FIG. 23B is a schematic diagram to show an example of an external information similarity calculation database.
Figure 24B:
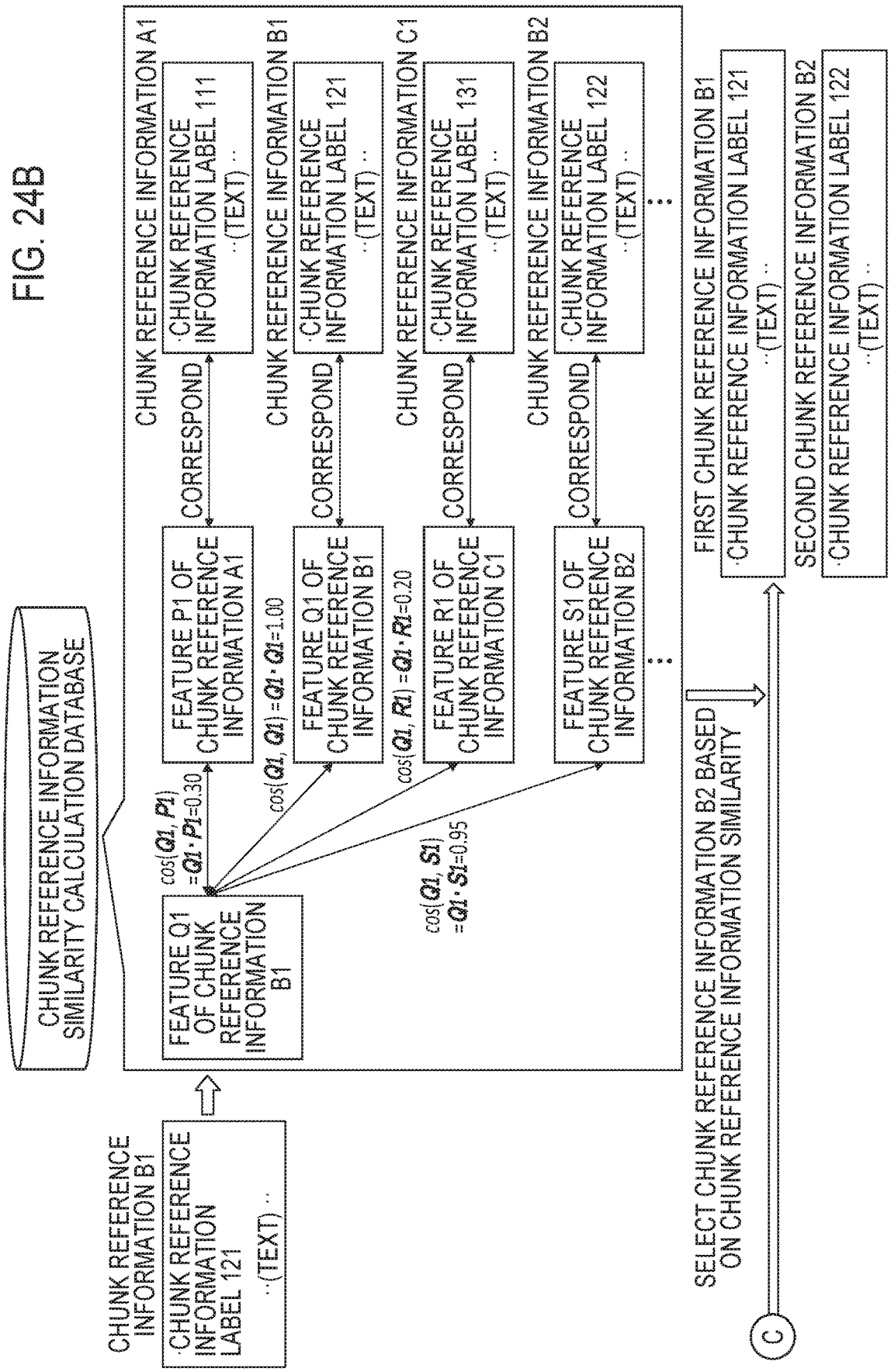
FIG. 24B is a schematic diagram to show an example of a chunk reference information similarity calculation database.

FIG. 23A is a schematic diagram to show an example of a content association database. FIG. 23B is a schematic diagram to show an example of the external information similarity calculation database. "A" in FIG. 23A is connected to "A" in FIG. 23B. "B" in FIG. 23A is connected to "B" in FIG. 23B. FIG. 24A is a schematic diagram to show an example of a content association database. FIG. 24B is a schematic diagram to show an example of the chunk reference information similarity calculation database. "C" in FIG. 24A is connected to "C" in FIG. 24B.

<External Information Similarity Calculation Database>

The external information similarity calculation database is built on machine learning, using external information. As for the method for machine learning, for example, external information is vectorized and learned as training data. The vectorized external information is associated with external information labels in the external information and stored in the external information similarity calculation database. The vectorized external information may be associated with the external information and stored in the external information similarity calculation database.

<Chunk Reference Information Similarity Estimation Processing Database>

The chunk reference information similarity estimation processing database is built on machine learning, using external information. As for the method for machine learning, for example, chunk reference information is vectorized and learned as training data. The vectorized chunk reference information is associated with chunk reference information labels in the chunk reference information, and stored in the chunk reference information similarity estimation processing database. The vectorized chunk reference information may be associated with the chunk reference information and stored in the chunk reference information similarity estimation processing database.

<External Information Acquiring Unit 31>

The external information acquiring unit 31 acquires a variety of types of information, such as external information, specific external information and so on. The specific external information is external information for which the external information similarity is to be calculated.

<External Information Comparison Unit 32>

The external information comparison unit 32 compares the external information stored in the content association database with the specific external information acquired by the external information acquiring unit 31. The external information comparison unit 32 judges whether the external information matches with the specific external information or not.

In the example of FIG. 23A and FIG. 23B, the specific external information acquired by the external information acquiring unit 31 includes "external information x", "external information a1", and "external information c1". Then, the external information comparison unit 32 compares "external information x", "external information a1", and "external information c1" included in the specific external information, with the external information stored in the content association database. Assume that "external information a1" and "external information c1" are stored in the content association database, and "external information x" is not stored. In this case, the external information comparison unit 32 judges that "external information a1" and "external information c1" included in the specific external information match with the external information stored in the content association database. Furthermore, the external information comparison unit 32 judges that "external information x" does not match with the external information stored in the content association database.

<External Information Similarity Calculation Unit 33>

When the external information comparison unit 32 judges that the external information does not match with specific external information, the external information similarity calculation unit 33 looks up the external information similarity calculation database, and calculates the external information similarity, which shows the similarity between external information stored in the external information similarity calculation database and the specific external information acquired by the external information acquiring unit 31. The external information similarity calculation unit 33 calculates the external information similarity using the feature of the external information. For the feature of the external information, for example, the vector representation of the external information may be used. In the external information similarity calculation unit 33, the specific external information is vectorized, and then subjected to a vector operation with the external information vectorized in the external information similarity calculation database, so that the external information similarity between the specific external information and the external information is calculated.

Note that, when the external information comparison unit 32 determines that the external information matches with the specific external information, the external information similarity calculation unit 33 does not calculate the external information similarity.

The external information similarity shows how similar specific external information and external information are, and is expressed in 100 decimals from 0 to 1 (e.g., 0.97), in percentage, in three or more levels such as ten levels, five levels, and so on.

Referring to the example of FIG. 23A and FIG. 23B, the external information comparing unit 32 judges that "external information x" included in specific external information does not match with the external information stored in the content association database. In this case, the external information similarity calculation unit 33 looks up the external information similarity calculation database, and calculates the external information similarity of "external information x" included in the specific external information to each of "external information a1", "external information b1", "external information c1", and "external information b2" stored in the external information similarity calculation database. The external information similarity between "external information x" and "external information a1" is calculated by calculating the inner product of "feature q2 of external information x" and "feature p1 of external information a1", and, for example, "0.20" is calculated. Likewise, the external information similarity between "external information x" and "external information b1" is "0.98". The external information similarity between "external information x" and "external information c1" is "0.33". The external information similarity between "external information x" and "external information b2" is "0.85". This means that "external information x" is more similar to "external information b1" than to "external information a1".

<Chunk Reference Information Extraction Unit 34>

The chunk reference information extraction unit 34 selects first external information from a plurality of items of external information, based on the external information similarities calculated, looks up the content association database, and extracts the chunk reference information that corresponds to the first external information selected, as first chunk reference information. When selecting one item of first external information from a plurality of items of external information, the chunk reference information extraction unit 34 extracts one item of chunk reference information that corresponds that selected one item of first external information, as first chunk reference information. Also, when selecting a plurality of items of first external information, the chunk reference information extraction unit 34 may extract chunk reference information corresponding to each selected item of first external information, as first chunk reference information.

Based on the external information similarities calculated, the chunk reference information extraction unit 34 may select first external information from each external information label included in these items of external information. The chunk reference information extraction unit 34 may extract, based on the external information label selected (the first external information), chunk reference information that corresponds to an external information label and that is stored in the content association database, as first chunk reference information. For example, the chunk reference information extraction unit 34 may select an external information label 21, and, from this external information label 21 selected, extract chunk reference information B1, which corresponds to the external information label 21 and which is stored in the content association database, as first chunk reference information. The external information label consists of a character string, so that the volume of the external information similarity calculation database can be reduced compared to when external information of sentence information is stored.

In the example of FIG. 23A and FIG. 23B, the chunk reference information extraction unit 34, having calculated external information similarities, selects "external information b1", which derives the highest external information similarity, from "external information a1", "external information b1", "external information c1", and "external information b2", as first external information. When selecting first external information, the chunk reference information extraction unit 34 may set a threshold for the external information similarity, and select external information which derives external information similarity that is equal to or greater than or smaller than the threshold. This threshold can be appropriately set by the user.

Then, the chunk reference information extraction unit 34 looks up the content association database, and extracts "chunk reference information B1", which corresponds to "external information b1" selected as first external information, as first chunk reference information.

Furthermore, based on the chunk reference information similarities (described later), the chunk reference information extraction unit 34 further extracts one or more items of second chunk reference information, which are different from the first chunk reference information, from the content association database.

Based on the chunk reference information similarities calculated, the chunk reference information extraction unit 34 may select one or a plurality of chunk reference information labels from the chunk reference information labels included in a plurality of items of chunk reference information. From the selected chunk reference information labels selected, the chunk reference information extraction unit 34 may extract the chunk reference information that corresponds to the chunk reference information label stored in the content association database, as second chunk reference information. extract chunk reference information B2 that is stored in the content association database and that corresponds to the chunk reference information label 122, as second chunk reference information. The chunk reference information label consists of a character string, the volume of the chunk reference information similarity calculation database can be reduced compared to when chunk reference information of sentence information is stored.

<Chunk Reference Information Similarity Calculation Unit 35>

The chunk reference information similarity calculation unit 35 looks up the chunk reference information similarity estimation processing database, and calculates chunk reference information similarity, which shows the similarity between chunk reference information and the first chunk reference information extracted by the chunk reference information extraction unit 34. The chunk reference information similarity calculation unit 35 calculates the chunk reference information similarity using the feature of the chunk reference information. For the feature of the chunk reference information, for example, the vector representation of the chunk reference information may be used. In the chunk reference information similarity calculation unit 35, specific chunk reference information is vectorized, and then subjected to a vector operation with the chunk reference information vectorized in the chunk reference information similarity estimation processing database, so that the chunk reference information similarity between the specific chunk reference information and the chunk reference information is calculated.

The chunk reference information similarity shows how similar first chunk reference information and chunk reference information are, and, for example, is expressed in 100 decimals from 0 to 1 (e.g., 0.97), in percentage, in three or more levels such as ten levels, five levels, and so on.

In the example of FIG. 24A and FIG. 24B, the chunk reference information similarity calculation unit 35 looks up the chunk reference information similarity calculation database, and calculates the chunk reference information similarity of "chunk reference information B1", which is extracted as the first chunk reference information by the chunk reference information extraction unit 34, to each of "chunk reference information A1", "chunk reference information B1", "chunk reference information C1", and "chunk reference information B2", which are stored in the chunk reference information similarity calculation database. The chunk reference information similarity between "chunk reference information B1" and "chunk reference information A1" is calculated by, for example, calculating the inner product of "feature Q1 of chunk reference information B1" and "feature P1 of chunk reference information A1", and, for example, "0.30" is calculated. Similarly, the chunk reference information similarity between "chunk reference information B1" and "chunk reference information B1" is "1.00". The chunk reference information similarity between "chunk reference information B1" and "chunk reference information C1" is "0.20". The chunk reference information similarity between "chunk reference information B1" and "chunk reference information B2" is "0.95". This means that "chunk reference information B1" is more similar to "chunk reference information B2" than to "chunk reference information A1".

As described above, the chunk reference information extraction unit 34 further extracts one or more items of second chunk reference information, which are different from the first chunk reference information, based on chunk reference information similarities.

In the example of FIG. 24A and FIG. 24B, having calculated chunk reference information similarities, the chunk reference information extraction unit 34 extracts "chunk reference information B2", which derives predetermined chunk reference information similarity, from "chunk reference information A1", "chunk reference information B1", "chunk reference information C1", and "chunk reference information B2", as second chunk reference information. When selecting second chunk information, the chunk reference information extraction unit 34 may set a threshold for the chunk reference information similarity, and select chunk reference information which derives external information similarity that is equal to or greater than or smaller than the threshold. This threshold can be appropriately set by the user. Note that the chunk reference information that derives the chunk reference information similarity "1.00" matches the first chunk reference information, and therefore may be excluded from being selected as second chunk reference information.

(Second Example of Variation of Operation of Information Providing System 100)

Next, a second example of a variation of the operation of the information providing system 100 according to the present embodiment will be described. FIG. 25 is a flowchart to show the second example of a variation of the operation of the information providing system 100 according to the present embodiment.

<External Information Acquiring Step S31>

The external information acquiring unit 31 acquires one or more items of external information, in which specifications and the like are divided into a chunk structure, as specific external information (external information acquiring step S31). External information acquiring step S31 is performed after reference information selection step S14.

<External Information Comparison Step S32>

Next, the external information comparison unit 32 compares the specific external information acquired by the external information acquiring unit 31 (external information comparison step S32). The external information comparison unit 32 judges whether the external information matches with the specific external information or not.

<External Information Similarity Calculation Step S33>

Next, when the external information comparison unit 32 judges that the external information does not match with specific external information, the external information similarity calculation unit 33 looks up the external information similarity calculation database, and calculates the external information similarity, which shows the similarity between external information stored in the external information similarity calculation database and the specific external information acquired by the external information acquiring unit 31 (external information similarity calculation step S33).

<First Chunk Reference Information Extraction Step S34>

The chunk reference information extraction unit 34 selects first external information from a plurality of items of external information, based on the external information similarities calculated, looks up the content association database, and extracts the chunk reference information that corresponds to the first external information selected, as first chunk reference information (first chunk reference information extraction step S34).

<Chunk Reference Information Similarity Calculation Step S35>

Next, the chunk reference information similarity calculation unit 35 looks up the chunk reference information similarity estimation processing database, and calculates chunk reference information similarity, which is the similarity between chunk reference information stored in the chunk reference information similarity estimation processing database and the first chunk reference information extracted by the chunk reference information extraction unit 34 (chunk reference information similarity calculation step S35).

<Second Chunk Reference Information Extraction Step S36>

Next, the chunk reference information extraction unit 34 further extracts one or more items of second chunk reference information, which are different from the first chunk reference information, based on chunk reference information similarities (second chunk reference information extraction step S36).

Thus, the second example of a variation of the operation of the information providing system 100 is finished.

According to the present embodiment, a content association database that stores a plurality of items of chunk reference information, which is reference information divided into a chunk structure, and external information, which corresponds to each item of the chunk reference information, and which has been used to create the chunk reference information, an external information similarity calculation database that is built on machine learning, using a plurality of items of external information, an external information acquiring unit 31 that acquires specific external information, an external information comparison means for comparing external information with the specific external information, an external information similarity calculation unit 33 that, when the external information comparing unit 32 judges that the external information does not match with the specific external information, looks up the external information similarity calculation database, and calculates the external information similarity, which is the similarity between the external information and the specific external information, and a chunk reference information extraction unit 34 that selects first external information, from a plurality of items of external information, based on external information similarities, and, looking up a content association database, extracts chunk reference information that corresponds to the first external information as first chunk reference information, are provided.

According to the present embodiment, the external information similarity calculation unit 33 calculates the external information similarity for specific external information that is judged by the external information comparison unit 32 as not matching with the external information stored in the content association database. That is, if the external information comparison unit 32 judges that specific external information matches with the external information stored in the content association database, there is no need to calculate the external information similarity for this specific external information. Therefore, the external information similarity can be calculated more efficiently.

In particular, the present embodiment selects first external information from a plurality of items of external information based on external information similarities, looks up the content association database, and extracts chunk reference information that corresponds to the first external information selected, as first chunk reference information. By this means, first external information that is similar to specific external information is selected based on external information similarities that are evaluated quantitatively, so that the accuracy of selection of first external information can be improved.

In particular, the present embodiment looks up the content association database, and extracts chunk reference information that corresponds to the first external information, as first chunk reference information. Consequently, when specific external information contains new information or a change is made, the user can quickly find out which part of chunk reference information, which is divided reference information, the new information and change correspond to. Therefore, when reference information is updated, it is only necessary to update the chunk reference information that is extracted as first chunk reference information, so that the task of updating the reference information can be performed in a short time.

In other words, if given apparatus upgrades from version 1 to version 2, and part of the old specification is changed and a new specification is made, it is necessary to re-make old product manuals that have been made based on the old specification, into new manuals. According to the present embodiment, it is possible to select a candidate old specification that needs to be changed, from a new specification, and judge that an old manual that has been derived from this old specification needs to be changed in accordance with the new specification. In this case, the new specification, the old specification, and the old manuals are each divided into a chunk structure. Consequently, it is possible to efficiently extract only parts in the old manual that need to be changed in accordance with the new specification. Consequently, the user can easily find parts in the old manual where changes need to be made in accordance with the new specification. Therefore, for example, when making a new manual, it is possible to use the old manual on an as-is basis for parts where no changes are made to the specification, and newly make only parts where changes are made in the specification. In other words, only parts where changes are made in the specification need to be specified and edited. Consequently, manual editing tasks can be easily performed.

Also, the present embodiment includes a chunk reference information similarity estimation processing database that is built on machine learning using a plurality of items of chunk reference information, and a chunk reference information similarity calculation unit 35 that looks up the chunk reference information similarity estimation processing database, and calculates chunk reference information similarity, which shows the similarity between the chunk reference information and first chunk reference information, and the chunk reference information extraction unit 34 further extracts second chunk reference information, which is different from the first chunk reference information, based on the chunk reference information similarity.

According to the present embodiment, second chunk reference information, which is different from the first chunk reference information, is further extracted based on the chunk reference information similarity. By this means, second chunk reference information, which is similar to the first chunk reference information, is selected based on the chunk reference information similarity, which is evaluated quantitatively, so that the accuracy of selection of second chunk reference information can be improved. Consequently, when specific external information contains new information or a change is made, the user extracts second chunk reference information, which is similar to the first chunk reference information, so that the user can quickly find out which part of chunk reference information, which is divided reference information, the new information and change correspond to. Consequently, when updating reference information, it is only necessary to update the chunk reference information that is extracted as first chunk reference information and second chunk reference information, so that the task of updating the reference information can be performed in a short time.

That is, in the event given apparatus has multiple versions and a new specification is made by changing part of an old specification, then, each product manual that has been derived from the old specification needs to be made again, as a new manual. According to the present embodiment, it is possible to select a candidate old specification that needs to be changed, from a new specification, and judge that old manuals corresponding to this old specification and other manuals similar to the old manual need to be changed in accordance with the new specification. In this case, the new specification, the old specification, and the old manuals are each divided into a chunk structure. Consequently, it is possible to efficiently extract only parts in the old manual that need to be changed in accordance with the new specification. In this case, a plurality of similar old manuals can be targeted and extracted. Consequently, the user can easily find parts in the old manual where changes need to be made in accordance with the new specification, all at the same time. Therefore, for example, when making a new manual, it is possible to use the old manual on an as-is basis for parts where no changes are made to the specification, and newly make only parts where changes are made in the specification. In other words, only parts where changes are made in the specification need to be specified and edited. Consequently, manual editing tasks can be easily performed.

According to the present embodiment, after reference information selection step S14, external information acquiring step S31 is performed. This allows the user to compare the first reference information selected by the reference information selection unit 14 with the first chunk reference information and the second chunk reference information extracted by the chunk reference information extraction unit 34. Consequently, it is possible to quickly find out which parts need to be changed in the first reference information such as manuals.

Third Example of Variation of Information Providing Device 1

A third example of a variation of the information providing device 1 includes an external information acquiring unit 31, an external information comparison unit 32, an external information similarity calculation unit 33, a chunk reference information extraction unit 34, and a chunk reference information similarity calculation unit 35. Furthermore, the storage unit 104 further stores a content association database, an external information similarity calculation database, and a chunk reference information similarity estimation processing database.

FIG. 26 is a flowchart to show the third example of a variation of the operation of the information providing system 100 according to the present embodiment. With the second example of a variation, an example has been described in which external information acquiring step S31 is performed after reference information selection step S14. Now, with the third example of a variation, external information acquiring step S31, external information comparison step S32, external information similarity calculation step S33, first chunk reference information extraction step S34, chunk reference information similarity calculation step S35, and second chunk reference information extraction step S36 may be performed by skipping reference information selection step S14.

Fourth Example of Variation of Information Providing Device 1

A fourth example of a variation of the information providing device 1 is different from the second example of a variation and the third example of a variation in further including an access control unit. The access control unit is implemented when the CPU 101 runs programs stored in the storage unit 104 and elsewhere, by using the RAM 103 for the work area.

The access control unit controls access to chunk reference information. The access may be full access, read access and write access, review-only access, comment-only access, read-only access, and banned access. The access control unit operates based on access control information. The access control information includes user names and shows what access is granted to each user name. The access control information is stored in the storage unit 104, for example.

When a user is assigned full access, the user has full read and write access to chunk reference information, and, furthermore, that user can use any mode of user interface. For example, when full access is assigned, the user can change the format of chunk reference information. If the user is assigned read and write access, the user can read and write chunk reference information, but cannot change the format. In the event review-only access is assigned, the user can make changes to chunk reference information that is tracked. In the event comment-only access is assigned, the user can insert comments in chunk reference information, but cannot change the text information in chunk reference information. If read-only access is assigned, the user can view chunk reference information, but cannot make any changes to the chunk reference information and cannot insert any comments.

For example, assume that new chunk reference information is generated based on external information, and updating is performed using the newly generated chunk reference information. In this case, according to the present embodiment, an access control unit is further provided. This allows one or more specific users, among a plurality of users, to gain predetermined access based on access control information. That is to say, when there are a plurality of users to use chunk reference information, it is possible to link the types of editing control (such as, for example, the type in which read-only access is possible, the type in which full access is possible, and/or others) with user attribute-based authorities, and control these per chunk reference information. In particular, by allowing simultaneous access only for viewing, while allowing only authorized users to do editing such as writing, unintended editing can be prevented.

Although embodiments of the present invention have been described, these embodiments have been presented simply by way of example, and are not intended to limit the scope of the invention. These novel embodiments can be implemented in a variety of other forms, and various omissions, replacements, and changes can be made without departing from the spirit of the invention. These embodiments and modifications thereof are included in the scope and gist of the invention, and are also included in the invention described in claims and equivalents thereof.

REFERENCE SIGNS LIST

1: information providing device
4: instrumentation device
5: user terminal
6: server
7: public communication network
10: housing
11: acquiring unit
12: meta-ID selection unit
13: content ID selection unit 14: reference information selection unit
15: input unit
16: output unit
17: memory unit
18: control unit
21: first acquiring unit
22: first evaluation unit
23: first generation unit
31: external information acquiring unit
32: external information comparison unit
33: external information similarity calculation unit
34: chunk reference information extraction unit
35: chunk reference information similarity calculation unit
100: information providing system
101: CPU
102: ROM
103: RAM
104: storage unit
105: I/F
106: I/F
107: I/F
108: input part
109: output part
110: internal bus
S11: acquiring step
S12: meta-ID selection step
S13: content ID selection step
S14: reference information selection step
S21: first acquiring step
S22: first evaluation step
S23: first generation step
S24: acquiring step
S25: meta-ID selection step
S31: external information acquiring step
S32: external information comparison step
S33: external information similarity calculation step
S34: first chunk reference information extraction step
S35: chunk reference information similarity calculation step
S36: second chunk reference information extraction step

The invention claimed is:

1. An information providing system, comprising:
a meta-ID estimation processing database that is built on machine learning, using a data structure for machine learning, which includes a plurality of items of training data that each include evaluation target information including image data, and a plurality of meta-IDs respectively linked with the evaluation target information via a degree of meta association, wherein the image data included in the evaluation target information includes an image showing (i) the specific device and (ii) the specific identification label for identifying the specific device:
a reference database that stores a plurality of content IDs linked with the meta-IDs, and a plurality of items of reference information corresponding to the content IDs;
a content association database storing (i) a plurality of pieces of external information, the plurality of pieces of external information comprising content which is divided in a chunk structure, and (ii) a plurality of pieces of chunk reference information, in which reference information having a different attribute than the content is divided in a chunk structure, wherein the content association database stores the plurality of pieces of external information in association with the plurality of pieces of chunk reference information, the plurality of pieces of external information corresponding to the plurality of pieces of chunk reference information on a one-to-one basis, wherein the external information includes text information, the chunk reference information includes text information, and the external information is a chunk structure of a source of the reference information;
an external information similarity calculation database built on machine learning using the plurality of pieces of external information; and
a hardware processor that is configured to:
acquire input information including first image data including text information;
look up the meta-ID estimation processing database and select a first meta-ID, among the plurality of meta-IDs, based on the acquired input information;
look up the reference database and select a first content ID from among a plurality of the content IDs which are linked with the first meta-ID;
look up the reference database and select first reference information, among the plurality of items of reference information, based on the first content ID;
acquire specific external information, wherein the specific external information includes text information;
compare the external information stored in the content association database with the acquired specific external information, and judge whether or not the external information stored in the content association database matches with the acquired specific external information;
in a case in which it is judged that the external information stored in the content association database does not match with the acquired specific external information, look up the external information similarity calculation database, and calculate an external information similarity, which is a similarity between the external information and the acquired specific external information, wherein calculating the external information similarity comprises vectorizing the specific external information and calculating the external information similarity between the specific external information and the external information based on the vectorized external information and vector operations in the external information similarity calculation database; and
select first external information from the plurality of pieces of external information, based on the external information similarity, look up the content association database, and extract the chunk reference information associated with the first external information as first chunk reference information,
wherein in a case in which it is judged that the external information stored in the content association database matches with the acquired specific external information, the hardware processor does not calculate the external information similarity.

2. The information providing system according to claim 1, further comprising:
a chunk reference information similarity estimation processing database built on machine learning using the plurality of pieces of chunk reference information;
wherein the hardware processor is further configured to:
look up the chunk reference information similarity calculation database, and calculate a chunk reference information similarity, which is a similarity between the chunk reference information and the extracted first chunk reference information, and extract second chunk reference information different from the first chunk reference information, based on the chunk reference information similarity.

3. The information providing system according to claim 2, further comprising a plurality of content association databases storing the plurality of pieces of external information and the plurality of pieces of chunk reference information, in which the reference information, classified per attribute, is divided in a chunk structure, in association with each other.

4. The information providing system according to claim 1, wherein the hardware processor is further configured to:
acquire access control information including a user name and an access authority assigned to the user name, and
control editing of the chunk reference information by the user based on the access control information.

5. The information providing system according to claim 1, wherein the external information is a chunk structure of original text used to create the reference information.

6. The information providing system according to claim 1, wherein the external information is created in a first language and the chunk reference information is created in a second language different from the first language.

7. The information providing system according to claim 1, wherein the hardware processor selects the external information based on the external information similarity and a preset threshold.

\* \* \* \* \*